(12) United States Patent
Chou

(10) Patent No.: US 12,720,541 B2
(45) Date of Patent: Aug. 25, 2026

(54) SCHEDULING MULTIPLE COMMUNICATION CHANNELS VIA A SINGLE CONTROL ELEMENT

(71) Applicant: GOOGLE LLC, Mountain View, CA (US)

(72) Inventor: Kao-Peng Chou, Taoyuan City (TW)

(73) Assignee: GOOGLE LLC, Mountain View, CA (US)

( * ) Notice: Subject to any disclaimer, the term of this patent is extended or adjusted under 35 U.S.C. 154(b) by 608 days.

(21) Appl. No.: 18/019,087

(22) PCT Filed: Jul. 30, 2021

(86) PCT No.: PCT/US2021/043835
§ 371 (c)(1),
(2) Date: Jan. 31, 2023

(87) PCT Pub. No.: WO2022/026791
PCT Pub. Date: Feb. 3, 2022

(65) Prior Publication Data

US 2023/0284218 A1 Sep. 7, 2023

Related U.S. Application Data

(60) Provisional application No. 62/706,120, filed on Jul. 31, 2020.

(51) Int. Cl.
*H04W 72/1273* (2023.01)
*H04L 1/1812* (2023.01)
*H04W 72/23* (2023.01)

(52) U.S. Cl.
CPC ....... *H04W 72/1273* (2013.01); *H04L 1/1812* (2013.01); *H04W 72/23* (2023.01)

(58) Field of Classification Search
CPC ............. H04W 72/1273; H04W 72/23; H04W 72/0446; H04L 1/1812
See application file for complete search history.

(56) References Cited

U.S. PATENT DOCUMENTS 12,267,272 B2 4/2025 Zeng et al.
2012/0033645 A1* 2/2012 Mantravadi ......... H04W 72/044 370/336

(Continued)

FOREIGN PATENT DOCUMENTS

CN 111 278 056 A 6/2020
WO WO-2019/208948 A1 10/2019

(Continued)

OTHER PUBLICATIONS

Office Action for Australian Application No. 201318151, dated Aug. 25, 2023.

(Continued)

*Primary Examiner* — Hoang-Chuong Q Vu
(74) *Attorney, Agent, or Firm* — MARSHALL, GERSTEIN & BORUN LLP

(57) ABSTRACT

A base station can implement a method for scheduling downlink transmissions to a user equipment (UE). The method may be performed by processing hardware and includes transmitting to the UE a control element that includes information related to a first time resource for receiving a first downlink data unit associated with a media access control layer from the base station and a second time resource for receiving a second downlink data unit associated with the media access control layer from the base station (1102). The first time resource and the second time resource are non-consecutive and have different respective timeslot offsets within one or more frames, the information including an index into a table stored at the UE, the table specifying a plurality of candidate timeslot offsets for the (Continued)

700A

UE 102

BS 104

TDRA combinations 702A

DCI (First PDSCH and first NDI for first TB; second PDSCH and second NDI for second TB; first TDRA combination $\{K_{0\_1}, K_{0\_2}\}$; first HARQ ID) 704A Determine second HARQ ID 706A $K_{0\_1}$ First TB on first PDSCH 708A $K_{0\_2}$ Second TB on second PDSCH 710A ACK to first TB, ACK to second TB 712A first time resource (1104). In addition, the method includes transmitting to the UE the first downlink data unit over the first time resource and the second downlink data unit over the second resource (1106).

15 Claims, 14 Drawing Sheets

(56) References Cited

U.S. PATENT DOCUMENTS

| | | | | |
|---|---|---|---|---|
| 2014/0328260 | A1 | 11/2014 | Papasakellariou et al. | |
| 2017/0111925 | A1 | 4/2017 | Nigam et al. | |
| 2017/0339533 | A1* | 11/2017 | Huang | H04L 67/51 |
| 2018/0041417 | A1 | 2/2018 | Liu | |
| 2018/0375636 | A1 | 12/2018 | You et al. | |
| 2019/0320422 | A1 | 10/2019 | Al-Imari et al. | |
| 2020/0275483 | A1* | 8/2020 | Li | H04L 27/0006 |
| 2020/0396025 | A1* | 12/2020 | Sun | H04L 1/1664 |
| 2021/0144743 | A1* | 5/2021 | Rastegardoost | H04W 72/23 |
| 2021/0176762 | A1* | 6/2021 | Islam | H04B 7/0626 |
| 2021/0266978 | A1* | 8/2021 | Sakhnini | H04W 56/0045 |
| 2021/0329693 | A1* | 10/2021 | Nogami | H04W 72/0453 |
| 2022/0095371 | A1* | 3/2022 | Oh | H04W 74/08 |
| 2022/0377767 | A1* | 11/2022 | Ying | H04L 1/1887 |
| 2022/0408471 | A1* | 12/2022 | Mu | H04W 72/232 |
| 2023/0114857 | A1* | 4/2023 | Lou | H04L 5/0044<br>370/329 |
| 2023/0422273 | A1* | 12/2023 | Ye | H04L 1/1887 |

FOREIGN PATENT DOCUMENTS

| | | | |
|---|---|---|---|
| WO | WO-2020/027587 | A1 | 2/2020 |
| WO | WO-2020/125369 | A1 | 6/2020 |
| WO | WO-2020/153624 | A1 | 7/2020 |
| WO | WO-2022/026791 | A1 | 2/2022 |
| WO | WO-20220/097378 | A1 | 5/2022 |

OTHER PUBLICATIONS

"3rd Generation Partnership Project; Technical Specification Group Radio Access Network; NR; Multiplexing and Channel Coding (Release 16)," 3GPP Standards (2020).

"3rd Generation Partnership Project; Technical Specification Group Radio Access Network; NR; Physical Layer Procedures for Data (Release 16)," 3GPP Standards (2020).

"3rd Generation Partnership Project; Technical Specification Group Radio Access Network; NR; Radio Resource Control (RRC)," 3GPP Standards (2020).

International Search Report and Written Opinion for Application No. PCT/US2021/043835, dated Nov. 18, 2021.

"3rd Generation Partnership Project; Technical Specification Group Radio Access Network; NR; Physical layer procedures for control," 3GPP TS 38.213 version 16.1.0 (Release 16) (2020).

* cited by examiner

SCHEDULING MULTIPLE COMMUNICATION CHANNELS VIA A SINGLE CONTROL ELEMENT

TECHNICAL FIELD

This disclosure relates generally to wireless communications and, more particularly, to scheduling multiple communication channels via a single control element.

BACKGROUND

This background description is provided for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In wireless cellular communication systems, base stations of a radio access network (RAN) can communicate control information and data to a user equipment (UE) via various channels. To prepare the UE to receive downlink data, a base station can transmit a downlink control information (DCI) to the UE on a physical downlink control channel (PDCCH). The DCI includes a transmission configuration (e.g., parameters indicating precoding, modulation scheme, resource allocation, etc.) for a physical downlink shared channel (PDSCH). Based on the DCI, the UE can configure itself to monitor for a downlink data transmission on the PDSCH.

A UE may be configured to only monitor for a PDCCH at given time resources or "slots." Depending on the capability of a UE, the UE may be unable to monitor for a PDCCH at each slot of a frame. For example, due to low bandwidth capabilities or power requirements, a UE may only be capable of monitoring for a PDCCH at every two to three slots. Conventionally, a DCI carried by a PDCCH configures one PDSCH resource assignment (RA). Thus, if a UE cannot monitor for a PDCCH at each slot, the UE misses opportunities to receive downlink data.

SUMMARY

Generally speaking, a base station implements the techniques of this disclosure for scheduling multiple downlink data channel resource assignments (e.g., PDSCHs) via a single control element (e.g., a single DCI). The base station can schedule contiguous or non-contiguous resources for PDSCHs carrying different data, such as medium access control (MAC) protocol data units (PDUs) for example. The scheduling technique of this disclosure does not require that the resources correspond to contiguous time slots, nor does the technique limit the corresponding multiple transmissions to the same payload.

For example, using the techniques of this disclosure, a base station can transmit to a UE a control element including information related to multiple timeslot resources for receiving different respective downlink data from the base station. The timeslot resources may be non-consecutive and have different respective offsets with one or more frames. Further, the different respective downlink data may correspond to different respective data units associated with the MAC layer.

To indicate when the UE should monitor for the downlink data associated with each timeslot resource, in some scenarios, the base station may include in the control element an index to a table including combinations of offsets for multiple timeslot resources. In other scenarios, the base station may include in the control element an index to a list of offsets for a first timeslot resource. The UE can determine offsets for the other timeslot resources based on the offset corresponding to the index and a slot format indicator (SFI) configuration, which indicates slots for which downlink transmissions to the UE are allowed.

If the base station receives a negative acknowledgement for any of the data associated with the indicated time resources, the base station can transmit a second control element scheduling a time resource for a re-transmission. In the second control element, the base station can also schedule additional time resources for new downlink data. To accommodate scheduling multiple PDSCHs within a single DCI, a new data indictor (NDI) field of the DCI can be extended to indicate, for multiple PDSCH timeslots, whether the PDSCH slots are for new data or are re-transmissions. Further, the DCI may indicate the same or different physical uplink control channels (PUCCHs) the UE can use to report feedback regarding the multiple PDSCHs.

An example embodiment of the techniques of this disclosure is a method in a base station for scheduling downlink transmissions to a UE. The method may be performed by processing hardware and includes transmitting to the UE a control element that includes information related to a first time resource for receiving a first downlink data unit associated with a media access control layer from the base station and a second time resource for receiving a second downlink data unit associated with the media access control layer from the base station. The first time resource and the second time resource are non-consecutive and have different respective timeslot offsets within one or more frames. In addition, the method includes transmitting to the UE the first downlink data unit over the first time resource and the second downlink data unit over the second resource.

Another example embodiment of these techniques is a base station including processing hardware and configured to implement the method above.

Yet another example embodiment of these techniques is a method in a UE for managing reception of downlink transmissions from a base station. The method may be performed by processing hardware and includes receiving from the base station a control element that includes information related to a first time resource for receiving a first downlink data unit associated with a media access control layer from the base station and a second time resource for receiving a second downlink data unit associated with the media access control layer from the base station. The first time resource and the second time resource are non-consecutive and have different respective timeslot offsets within one or more frames. In addition, the method includes monitoring the first time resource for the first downlink data unit and the second time resource for the second downlink data unit.

A further example embodiment of these techniques is a UE including processing hardware and configured to implement the method above.

DETAILED DESCRIPTION OF THE DRAWINGS

Figure 1:
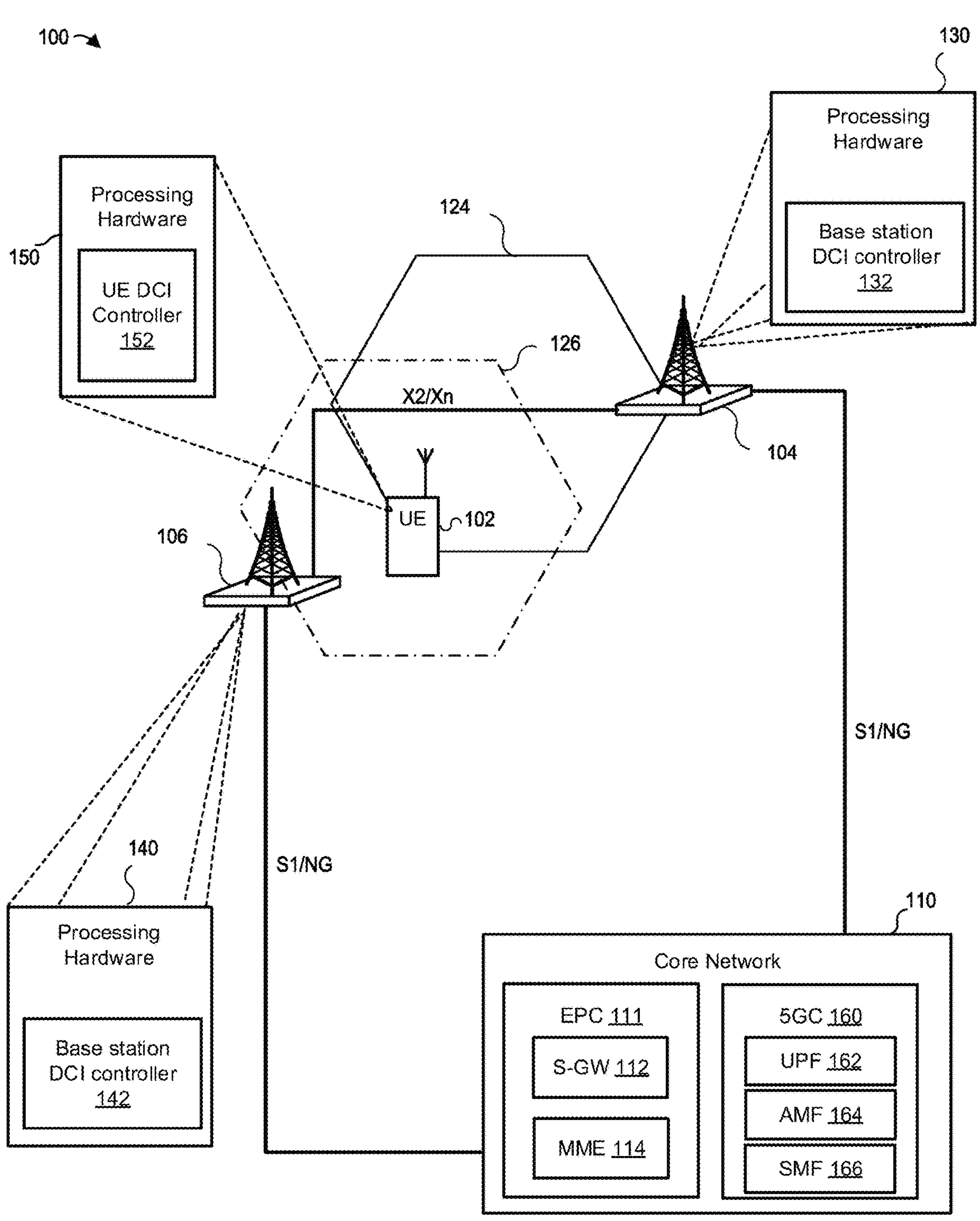
FIG. 1 is a block diagram of an example system in which a base station of a radio access network (RAN) and a user equipment (UE) can implement the techniques of this disclosure for scheduling downlink transmissions.

FIG. 1 depicts an example wireless communication system 100 in which communication devices can implement the techniques of this disclosure. The wireless communication system 100 includes a UE 102, a base station 104, a base station 106, and a core network (CN) 110. The techniques of this disclosure can be implemented in one or both of the base stations 104 and 106.

The base stations 104 and 106 can be any suitable type, or types, of base stations, such as an evolved node B (eNB), a next-generation eNB (ng-eNB), or a 5G Node B (gNB), for example. The UE 102 can communicate with the base station 104 and the base station 106 via the same radio access technology (RAT), such as EUTRA or NR, or different RATs. The base station 104 supports a cell 124, and the base station 106 supports a cell 126. The cell 124 partially overlaps with the cell 126, such that the UE 102 can be in range to communicate with the base station 104 while simultaneously being in range to communicate with the base station 106 (or in range to detect or measure the signal from the base station 106). The overlap can make it possible for the UE 102 to hand over between cells (e.g., from the cell 124 to the cell 126) or base stations (e.g., from the base station 104 to the base station 106). As another example, the UE 102 can communicate in dual connectivity (DC) with the base station 104 (operating as an MN) and the base station 106 (operating as an SN).

The base stations 104 and 106 can operate in a radio access network (RAN) connected to a core network (CN) 110, which can be an evolved packet core (EPC) 111 or a fifth-generation core (5GC) 160. The base station 104 can be implemented as an eNB supporting an S1 interface for communicating with the EPC 111, an ng-eNB supporting an NG interface for communicating with the 5GC 160, or as a gNB that supports the NR radio interface as well as an NG interface for communicating with the 5GC 160. The base station 106 can be implemented as an eNB with an S1 interface to the EPC 111, an ng-eNB that does not connect to the EPC 111, a gNB that supports the NR radio interface as well as an NG interface to the 5GC 160, or a ng-eNB that supports an EUTRA radio interface as well as an NG interface to the 5GC 160. To directly exchange messages during the scenarios discussed below, the base stations 104 and 106 can support an X2 or Xn interface.

Among other components, the EPC 111 can include a Serving Gateway (S-GW) 112 and a Mobility Management Entity (MME) 114. The S-GW 112 is generally configured to transfer user-plane packets related to audio calls, video calls, Internet traffic, etc., and the MME 114 is configured to manage authentication, registration, paging, and other related functions. The 5GC 160 includes a User Plane Function (UPF) 162 and an Access and Mobility Management (AMF) 164, and/or Session Management Function (SMF) 166. Generally speaking, the UPF 162 is configured to transfer user-plane packets related to audio calls, video calls, Internet traffic, etc., the AMF 164 is configured to manage authentication, registration, paging, and other related functions, and the SMF 166 is configured to manage PDU sessions.

In general, the wireless communication network 100 can include any suitable number of base stations supporting NR cells and/or EUTRA cells. More particularly, the EPC 111 or the 5GC 160 can be connected to any suitable number of base stations supporting NR cells and/or EUTRA cells. Although the examples below refer specifically to specific CN types (EPC, 5GC) and RAT types (5G NR and EUTRA), in general the techniques of this disclosure also can apply to other suitable radio access and/or core network technologies such as sixth generation (6G) radio access and/or 6G core network or 5G NR-6G DC, for example.

With continued reference to FIG. 1, the base station 104 is equipped with processing hardware 130 that can include one or more general-purpose processors (e.g., central processing units (CPUs)) and a non-transitory computer-readable memory storing machine-readable instructions executable on the one or more general-purpose processor(s), and/or special-purpose processing units. The processing hardware 130 in an example implementation includes a base station DCI controller 132 configured to manage or control generating and transmitting DCI to support the techniques discussed below.

The base station 106 is equipped with processing hardware 140 that can also include one or more general-purpose processors, such as CPUs, and a non-transitory computer-readable memory storing machine-readable instructions executable on the one or more general-purpose processors, and/or special-purpose processing units. The processing hardware 140 in an example implementation includes a base station DCI controller 142, which may be similar to the base station controller 132.

Still referring to FIG. 1, the UE 102 is equipped with processing hardware 150 that can include one or more general-purpose processors, such as CPUs, and a non-transitory computer-readable memory storing machine-readable instructions executable on the one or more general-purpose processors, and/or special-purpose processing units. The processing hardware 150 in an example implementation includes a UE DCI controller 152 configured to manage or control receiving and analyzing DCI to support the techniques discussed below.

In operation, the UE 102 can use a radio bearer (e.g., a data radio bearer (DRB) or a signaling radio bearer (SRB)) that at different times terminates at the base station 104 or the base station 106. The UE 102 can apply one or more security keys when communicating on the radio bearer, in the uplink (from the UE 102 to a base station) and/or downlink (from a base station to the UE 102) direction.

Figure 2:
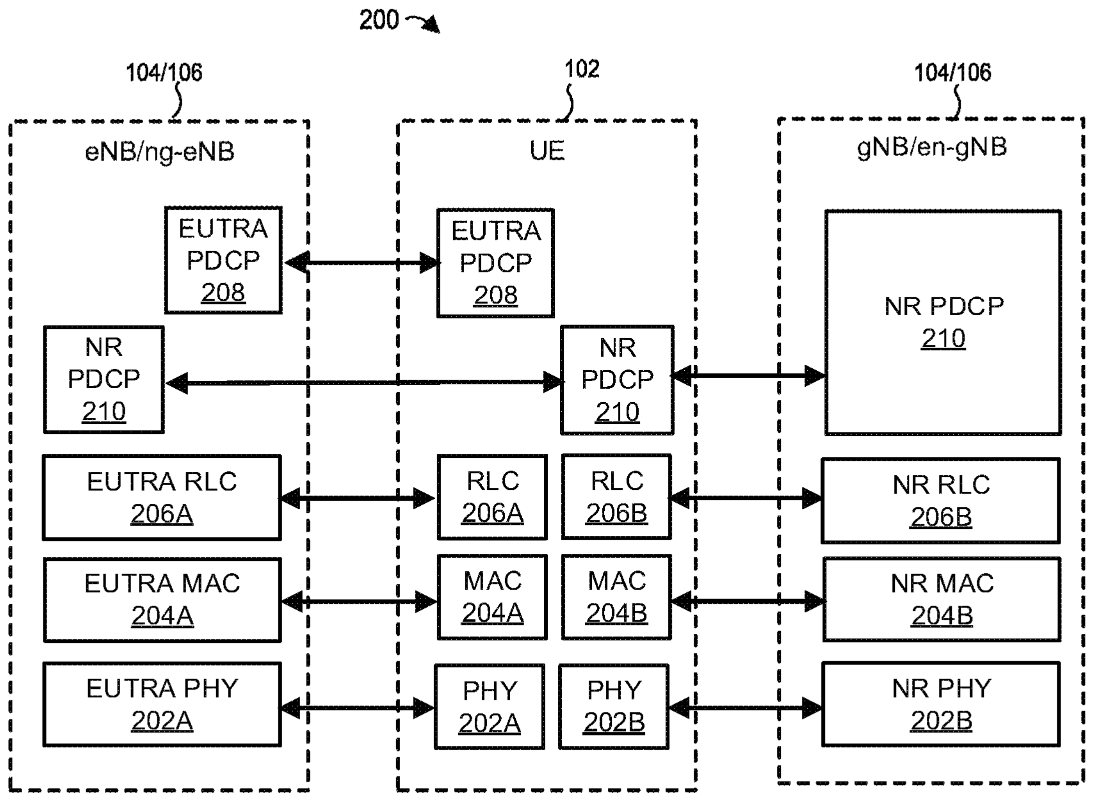
FIG. 2 is a block diagram of an example protocol stack according to which the UE of FIG. 1 communicates with base stations.

Next, FIG. 2 illustrates, in a simplified manner, an example radio protocol stack 200 according to which the UE 102 can communicate with an eNB/ng-eNB or a gNB (e.g., one or more of the base stations 104 and 106). The physical layer (PHY) 202A of EUTRA provides transport channels to the EUTRA Medium Access Control (MAC) sublayer 204A, which in turn provides logical channels to the EUTRA Radio Link Control (RLC) sublayer 206A. The EUTRA RLC sublayer 206A in turn provides RLC channels to the EUTRA PDCP sublayer 208 and, in some cases, to the NR PDCP sublayer 210. Similarly, the NR PHY 202B provides transport channels to the NR MAC sublayer 204B, which in turn provides logical channels to the NR RLC sublayer 206B. The NR RLC sublayer 206B in turn provides RLC channels to the NR PDCP sublayer 210. The UE 102 in some implementations supports both the EUTRA and the NR stack in order to support handover between EUTRA and NR base stations and/or to support DC over EUTRA and NR interfaces. Further, as illustrated in FIG. 2, the UE 102 can support layering of the NR PDCP sublayer 210 over the EUTRA RLC sublayer 206A.

The EUTRA PDCP sublayer 208 and the NR PDCP sublayer 210 receive packets (e.g., from an Internet Protocol (IP) layer, layered directly or indirectly over the PDCP layer 208 or 210) that can be referred to as service data units (SDUs), and output packets (e.g., to the RLC layer 206A or 206B) that can be referred to as protocol data units (PDUs). Except where the difference between SDUs and PDUs is relevant, this disclosure for simplicity refers to both SDUs and PDUs as "packets."

On a control plane, the EUTRA PDCP sublayer 208 and the NR PDCP sublayer 210 provide SRBs to exchange RRC messages, for example. On a user plane, the EUTRA PDCP sublayer 208 and the NR PDCP sublayer 210 provide DRBs to support data exchange.

Figure 3:
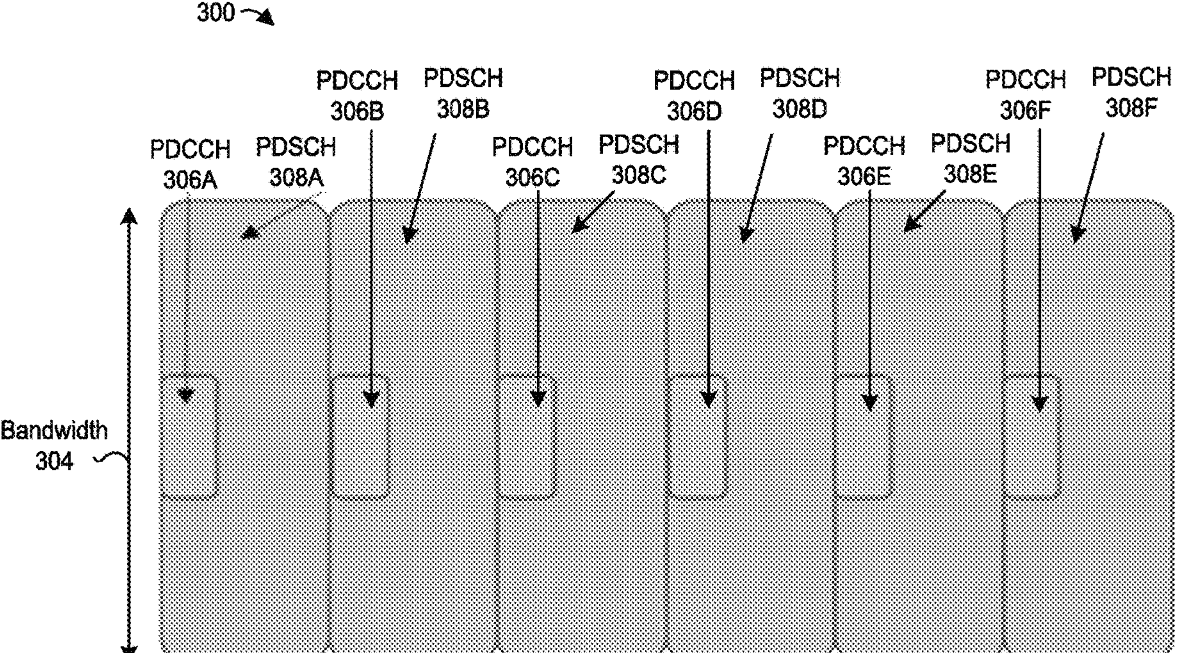
FIG. 3 is a block diagram of a slot configuration for a UE supporting a large bandwidth and configured to monitor for downlink control elements in each slot.
Figure 4:
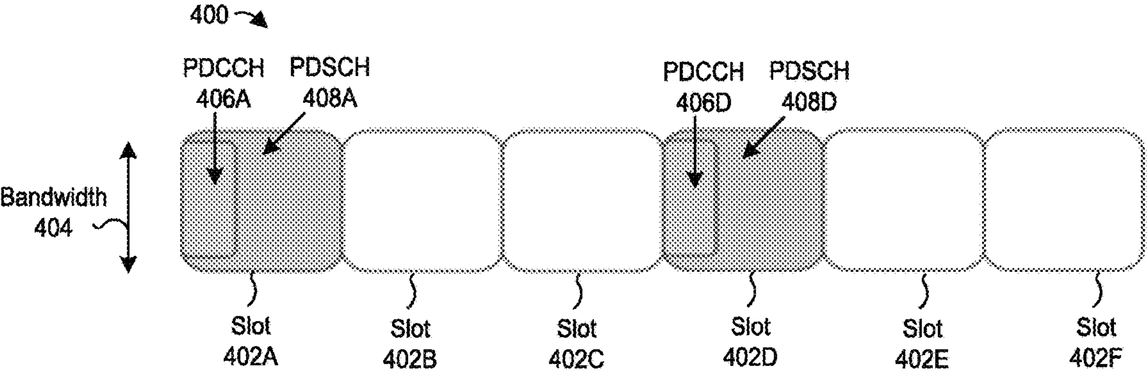
FIG. 4 is a block diagram of a slot configuration for a UE supporting a smaller bandwidth than the UE of FIG. 3 and configured to monitor for downlink control elements at every third slot.
Figure 5:
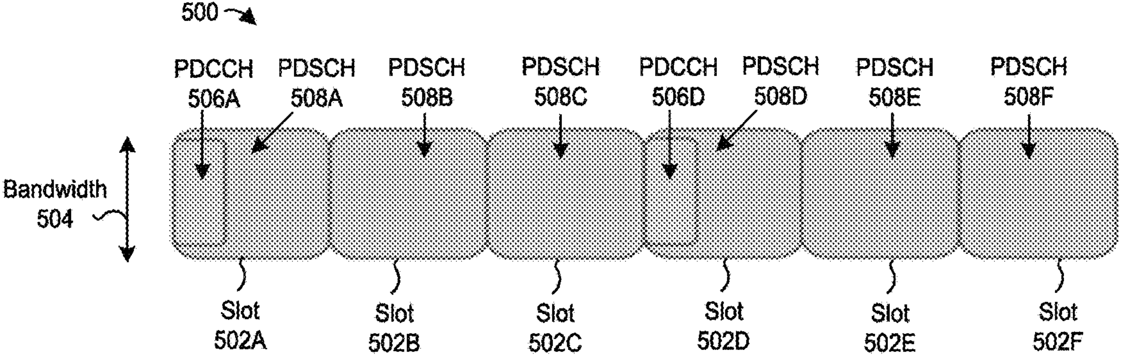
FIG. 5 is a block diagram of a slot configuration for a UE similar to the UE of FIG. 4, but where each downlink control element schedules multiple downlink data channel resource assignments, in accordance with the techniques of this disclosure.
Figure 6:
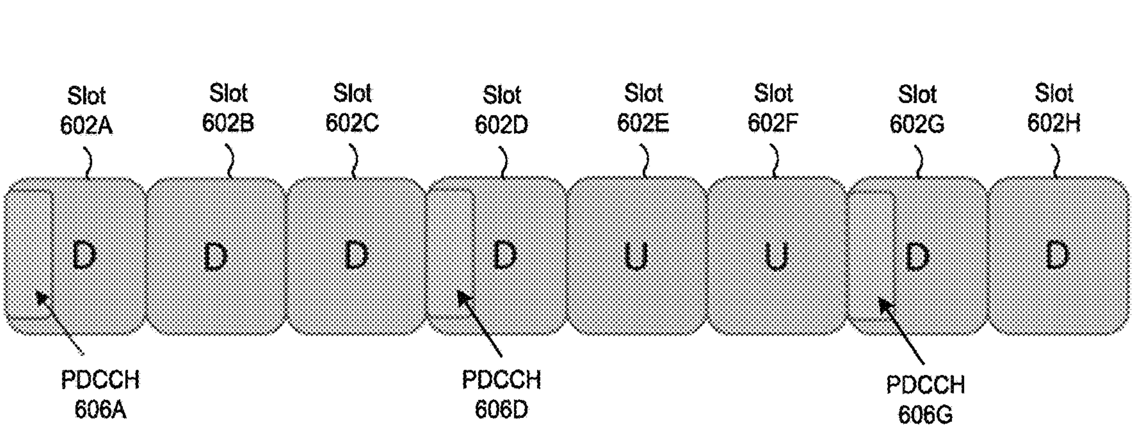
FIG. 6 is a block diagram indicating an example slot format configuration for a UE.

Next, FIGS. 3 through 6 illustrate slot configurations for transmissions between the UE 102 and a base station (e.g., the base station 104). In particular, FIGS. 3-4 illustrate slot configurations that may be configured in prior art, while FIGS. 5-6 illustrate slot configurations that may be configured in accordance with the techniques of this disclosure. Generally speaking, "time slots" or simply "slots" refer to time resources, typically of a fixed duration, in which a certain period of time is partitioned in accordance with a time domain duplex (TDD) scheme for communicating information between devices. According one of these schemes, time units known as frames are divided into subframes (e.g., 10 subframes may make up a frame), subframes are divided into slots (e.g., two slots may make a subframe), and slots are divided into Orthogonal Frequency Division Multiplexing (OFDM) symbols (e.g., 14 symbols may make up a slot).

Referring first to FIG. 3, the example slot configuration 300 is suitable for a UE supporting a large bandwidth 304 and configured to monitor for downlink control elements in each slot. The slot configuration 300 includes six slots, 302A-302F. At each slot, the UE is configured to monitor for a PDCCH (PDCCHs 306A-306F in slots 302A-302F, respectively), where each PDCCH may carry DCI scheduling a PDSCH (PDSCHs 308A-308F scheduled via DCI carried by PDCCHs 306A-306F, respectively). For example, the PDCCH 306A carries one DCI that schedules one PDSCH, the PDSCH 308A.

However, as indicated above, a UE may not have the capability to monitor for a PDCCH at each slot. FIG. 4 is a block diagram of a slot configuration 400 for a UE supporting a bandwidth 404 and configured to monitor for downlink control elements at every third slot. Although the bandwidth 404 is smaller than the bandwidth 304, this is not a critical difference; the bandwidth 404 could be larger than or equivalent to the bandwidth 304. The slot configuration 400 includes six slots, 402A-402F, but the UE may only be capable of monitoring for a PDCCH at the slot 402A and the slot 402D. Accordingly, for the six slots, the UE can only receive the PDCCH 406A including DCI scheduling the PDSCH 408A and the PDCCH 406D including DCI scheduling the PDSCH 408D. As a result, the UE of FIG. 4 has fewer opportunities than the UE of FIG. 3 to receive downlink data. The techniques of this disclosure address this issue, as discussed with reference to FIG. 5.

FIG. 5 is a block diagram of a slot configuration 500 for a UE (e.g., the UE 102) similar to the UE of FIG. 4, but where each downlink control element schedules multiple downlink data channel time domain resource assignments, in accordance with the techniques of this disclosure. Similar to FIG. 4, the UE may be configured to monitor for a PDCCH at slots 502A and 502D of the fuller sequence of slots 502A-502F. However, a PDCCH 506A of FIG. 5 (received at slot 502A) includes a DCI scheduling PDSCHs 508A, 508B, and 508C, to be received at slots 502A-502C respectively. Similarly, a PDCCH 506D, received at slot 502D, includes a DCI scheduling PDSCHs 508D, 508E, and 508F, to be received at slots 502D-502F, respectively. Thus, a single DCI schedules multiple PDSCHs. While FIG. 6 illustrates scheduling three PDSCHs in contiguous slots via a single DCI, the techniques of this disclosure can also use a single DCI to schedule multiple PDSCHs in non-contiguous slots that may be over one or more frames, as will be described below.

For example, FIG. 6 is a block diagram indicating an example time slot configuration for a UE in which downlink slots are scheduled non-contiguously. A time slot configuration indicates transmission directions for slots of one of more frames and is also referred to herein as a slot format indicator (SFI). The SFI indicates whether slots are downlink slots, uplink slots, or flexible slots. Flexible slots may be used for either uplink or downlink transmissions. Accordingly, downlink slots and flexible slots are allowed or "legal" slots for scheduling PDSCH (downlink) transmissions via a DCI. Conventionally, a base station may configure beginning slots of a frame as downlink slots, rear slots of the frame as uplink slots, and middle slots of the frame as flexible slots.

In FIG. 6, downlink slots 602A-602D and 602G-602H are labeled with a "D," and uplink slots 602E-602F are labeled with a "U." A UE may be capable of monitoring for PDCCH 606A at slot 602A, PDCCH 606D at slot 606D, and PDCCH 608G at slot 602G. Using the techniques of this disclosure, a base station can send a DCI on the PDCCH 606A at slot 602A to schedule three PDSCH transmissions in slots 602A, 602B, and 602C, or can send a DCI on PDCCH 606A to schedule four PDSCH transmissions in slots 602C, 602D, 602G, and 602H, for example. FIG. 6 will be referred to below in connection with time domain resource allocations (TDRAs).

Next, FIGS. 7A-7D and 8A-8D illustrate messaging diagrams between the UE 102 and the base station 104 in which the base station 104 schedules multiple downlink transmissions using a single control element. Generally speaking, events in FIGS. 7A-7D and 8A-8D that are similar are labeled with similar reference numbers (e.g., event 708A is similar to events 708B-708D and 808A-D), with differences discussed below where appropriate. With the exception of the differences shown in the figures and discussed below, any of the alternative implementations discussed with respect to a particular event (e.g., for messaging and processing) may apply to events labeled with similar reference numbers in other figures.

Figure 7A:
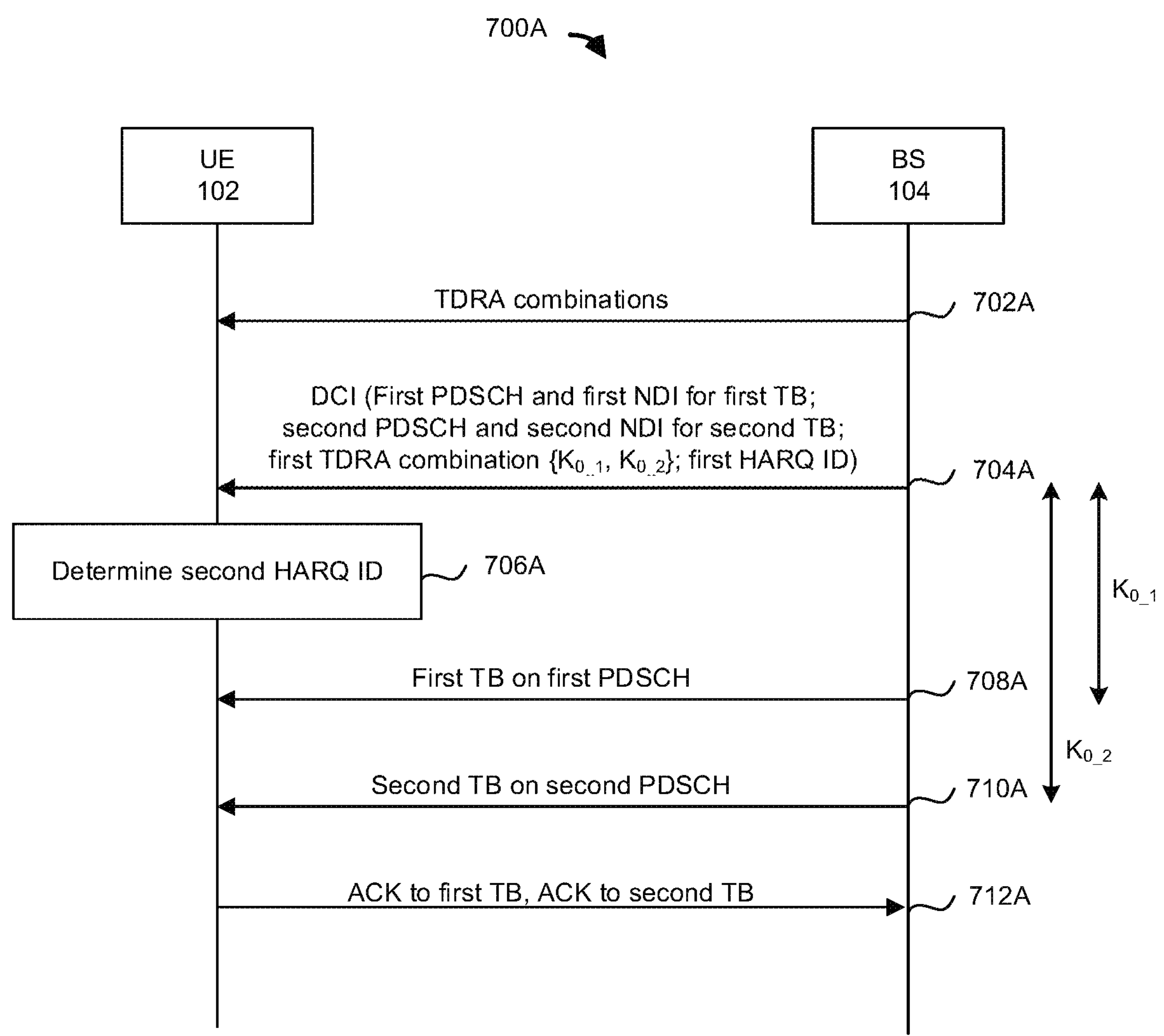
FIG. 7A is a messaging diagram of an example scenario in which a base station transmits to a UE a control element that schedules two downlink data channel time domain resource assignments and includes an index to a table including combinations of slot offsets.

Referring first to FIG. 7A, the base station 104 communicates with the UE 102 in a scenario 700A. Initially, the base station 104 transmits 702A combinations of TDRAs to the UE 102. The base station 104 may transmit 702A the TDRA combinations in a message conforming to an RRC protocol. Further, the base station 104 may transmit 702A the TDRA combinations in a table, where indices of the table correspond to different combinations of TDRAs. A TDRA is a slot offset, also referred to herein as an offset or time slot offset, for an uplink or downlink transmission. For example, a first TDRA combination may include TDRA values for a first TDRA and a second TDRA. The base station 104 may later send a DCI to the UE 102 scheduling multiple PDSCHs and indicating a particular TDRA combination (e.g., by including in the DCI a field corresponding to an index of a table). The UE 102 uses the particular TDRA combination to determine the offsets of the multiple PDSCHs from the slot where the DCI is received.

An example TDRA combination table is illustrated in Table 1 below.

TABLE 1

Example TDRA Combination Table

| Index | TDRA Value 1 | TDRA Value 2 | TDRA Value 3 | TDRA Value 4 |
|---|---|---|---|---|
| 1 | 0 | 1 | 2 | |
| 2 | 2 | 3 | 6 | 7 |
| 3 | $K_{0\_1}$ | $K_{0\_2}$ | | |

For example, referring back to FIG. 6, a DCI the UE 102 receives on the PDCCH 606A at the slot 602A may indicate a TDRA combination corresponding to the index "1" in Table 1. The row corresponding to index "1" has three entries and TDRA values {0, 1, 2}. Each TDRA value is associated with a different PDSCH. The number of entries of the TDRA combination indicate the number of PDSCHs that the DCI is scheduling. Based on the three TDRA values, the UE 102 monitors for a first PDSCH at a slot offset of 0 from the slot 602A (i.e., monitors the slot 602A), monitors for a second PDSCH at a slot offset of 1 from the slot 602A (i.e., monitors the slot 602B), and monitors for a third PDSCH at a slot offset of 2 from the slot 602A (i.e., monitors the slot 602C). As another example, referring again to FIG. 6, a DCI the UE 102 receives on the PDCCH 606A at the slot 602A may indicate a TDRA combination corresponding to the index "2" in Table 1. The row corresponding to index "2" has four entries and TDRA values {2, 3, 6, 7}. Based on the four TDRA values, the UE 102 monitors for the four PDSCHs at slot offsets 2, 3, 6, and 7 slots after the slot 602A (i.e., at slots 602C, 602D, 602G, and 602H). As a more general example, a TDRA combination corresponding to the index "3" of the Table 1 may include two TDRA values $\{K_{0\_1}, K_{0\_2}\}$. If the slot index where the UE 102 receives the DCI is slot $X_0$, then the UE 102 monitors the slot $X_0+K_{0\_1}$ for a first PDSCH, and the slot $X_0+K_{0\_2}$ for a second PDSCH. In some implementations, the base station may include an additional offset $K_{0\_off}$ in the DCI. As a result, the UE 102 monitors the slots $X_0+K_{0\_1}+K_{0\_off}$ for a first PDSCH, and the slot $X_0+K_{0\_2}+K_{0\_off}$ for a second PDSCH.

Referring back to FIG. 7A, the UE 102 receives 702A TDRA combinations from the base station 104 and stores the TDRA combinations. In some implementations, the UE 102 might not receive the TDRA combinations from the base station 104, but may be pre-configured to store a TDRA combinations table, or may receive the TDRA combinations from a different base station, such as the base station 106.

The base station 104 then generates a DCI to schedule two PDSCHs for the UE 102 and transmits 704A the DCI to the UE 102. The DCI includes first configuration parameters such as precoding information and a modulation scheme for a first PDSCH for a first downlink data unit (referred to herein as a transport block or "TB") and second configuration parameters for a second PDSCH for a second TB. The first and second TBs are not repeated data units of the same data. For example, the first and second TBs may be associated with different MAC PDUs.

In addition, the DCI includes a field indicating a first TDRA combination for the two PDSCHs, where the first TDRA combination includes two TDRA values $\{K_{0\_1}, K_{0\_2}\}$. The field may include the TDRA values, or may include an index to the TDRA combination table stored at the UE 102. For example, the index may correspond to a row of the table indicating values for both $K_{0\_1}$ and $K_{0\_2}$. The base station 104 can select the TDRA combination based on the PDCCH processing time of the UE 102, the number of PDSCH transmissions to be scheduled, and the relevant SFI configuration. The relevant SFI configuration may be transmitted within an earlier DCI and/or in an earlier RRC message. The base station 104 selects TDRA values that conform to the SFI configuration (i.e., such that the PDSCHs correspond to downlink or flexible slots). The slot offsets $K_{0\_1}$ and $K_{0\_2}$ may correspond to non-contiguous slots, and the slot offsets $K_{0\_1}$ and $K_{0\_2}$ may be different values.

Further, to support hybrid automatic repeat request (HARQ) procedures, the DCI includes at least a first HARQ identifier (e.g., a HARQ process number) for the first TB in the first PDSCH. Based on the first HARQ identifier, the UE 102 can determine 706A a second HARQ identifier for the second TB in the second PDSCH (e.g., by adding "1" to the first HARQ identifier). If the base station 104 schedules three PDSCHs transmissions using the DCI, then the UE 102 can determine a third HARQ identifier based on the second HARQ identifier (e.g., by adding "1" to the second HARQ identifier).

Still further, the DCI includes at least one new data indicator (NDI) indicating whether the first TB is new data or a retransmission, and whether the second TB is new data or a transmission. In some implementations, the DCI may include a first NDI for the first TB, and a second NDI for the second TB. In other implementations, the DCI may include a single NDI with at least two subfields indicating, respectively, whether the first TB is new or retransmitted data, and whether the second TB is new or retransmitted. For example, a "toggled" NDI corresponds to a transmission of new data, and a "non-toggled" NDI corresponds to a retransmission.

To schedule multiple PDSCHs via a single DCI, the base station 104 can use an extended format the NDI field of the DCI. Depending on the scenario, the base station 104 can configure a fixed-size NDI via RRC messaging, or the UE 102 can determine the NDI size based on the number of transmissions included in the DCI. For example, if each PDSCH scheduled by the DCI carries one TB, then the DCI includes a first NDI corresponding to the TB of the first PDSCH, and a second NDI corresponding to the TB of the second PDSCH. Each NDI in this case can take up one bit. In another example, if each PDSCH scheduled by the DCI carries two TBs, then the first NDI for the first PDSCH may take up two bits, one for each TB carried by the first PDSCH. Similarly, the second NDI for the second PDSCH may take up two bits, one for each TB carried by the second PDSCH. If the UE 102 receives a toggled NDI associated with the same HARQ identifier as a particular TB, then the UE 102 can determine that the particular TB is new data rather than a re-transmission.

To accommodate an extended NDI field size in the DCI, the base station 104 can configure NDI "bundling" for multiple PDSCHs. For instance, the base station 104 can send an RRC message to the UE 102 to configure NDI bundling with a bundling size M. If M=2, then the UE 102 can determine that a first NDI is associated with a first bundled set of two PDSCHs (e.g., a first and a second PDSCH), and that a second NDI is associated with a second bundled set of two PDSCHs (e.g., a third and a fourth PDSCH). Thus, two NDIs of one DCI can describe, for four PDSCHs scheduled by the DCI, whether the data is new or retransmitted, respectively.

After receiving 704A the DCI, the UE 102 determines that the DCI includes information related to two PDSCHs. Said another way, the UE 102 determines that the DCI includes information related to two time resources for receiving a first downlink data unit and a second downlink data unit, respectively, where a "time resource" can refer to a time slot on a channel such as a PDSCH. The UE 102 can determine 706A a second HARQ ID for the second TB, as discussed above. Further, the UE 102 determines, based the indication of the first TDRA combination in the DCI, the slot offsets $K_{0\_1}$ and $K_{0\_2}$ for the first PDSCH and the second PDSCH. For example, the DCI may include an index of a table stored at the UE 102 including the TDRA combinations, and the UE 102 can identify the slot offsets $K_{0\_1}$ and $K_{0\_2}$ in the table using the index. The UE 102 can then monitor the slots indicated by the slot offsets $K_{0\_1}$ and $K_{0\_2}$ for the first TB and the second TB.

At a slot indicated by the slot offset $K_{0\_1}$, the base station 104 transmits 708A the first TB on the first PDSCH to the UE 102. Similarly, at a slot indicated by the slot offset $K_{0\_2}$, the base station 104 transmits 710A the second TB on the second PDSCH to the UE 102. The UE 102 monitors for the first TB and the second TB at the appropriate slots. If the UE 102 successfully receives and decodes the first and second TBs, the UE 102 generates a HARQ feedback and transmits 712A the HARQ feedback to the base station 104. The HARQ feedback includes an ACK to the first TB and an ACK to the second TB.

Figure 7B:
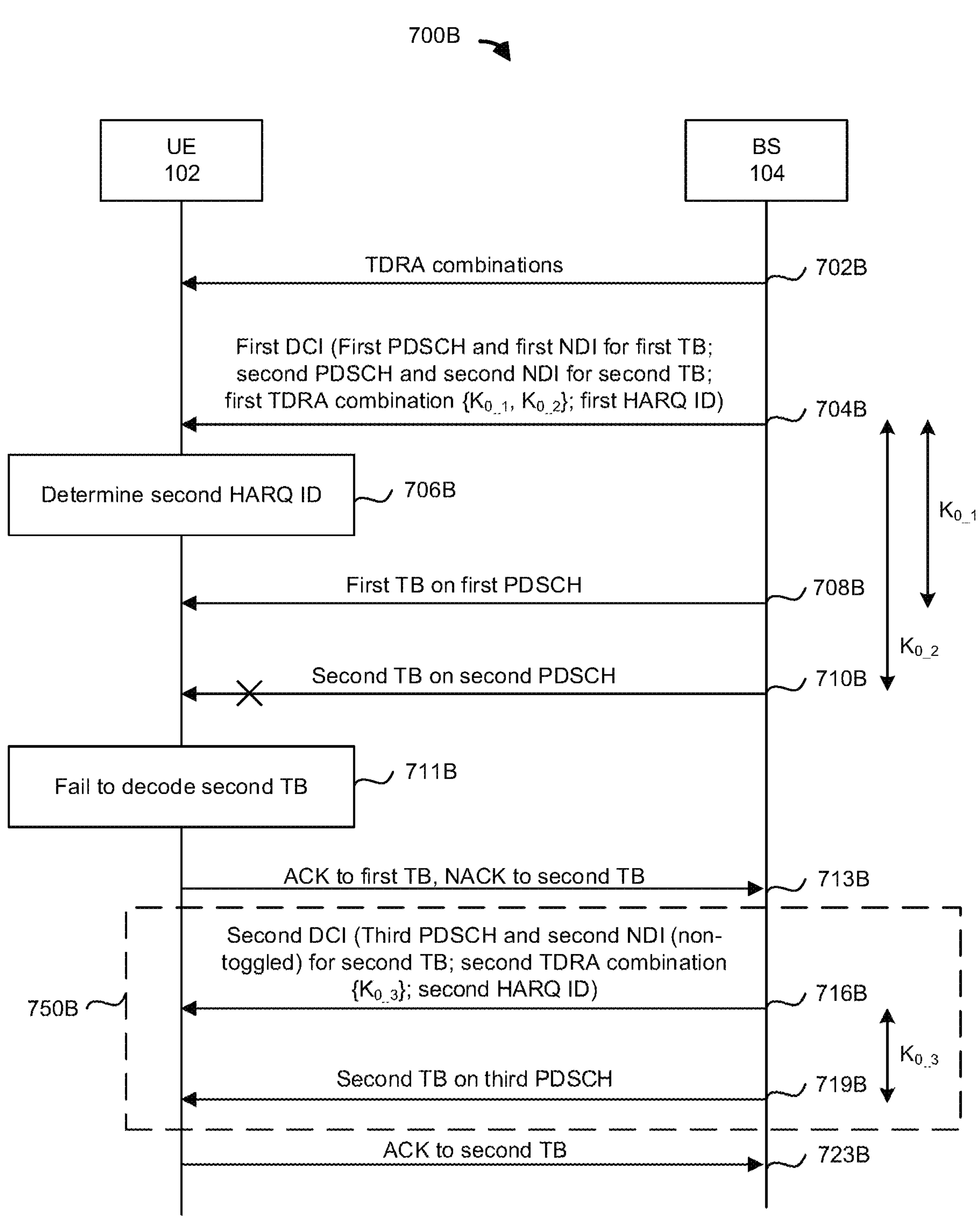
FIG. 7B is a messaging diagram of an example scenario similar to the scenario of FIG. 7A, but where the base station transmits a second control element that schedules a re-transmission of downlink data in response to receiving a negative acknowledgement from the UE.

Referring next to FIG. 7B, the base station 104 communicates with the UE 102 in a scenario 700B, which is generally similar to the scenario 700A. Events 702B, 704B, 706B, and 708B are similar to the events 702A, 704A, 706A, and 708A. However, while the base station 104 attempts to transmit 710B the second TB to the UE 102 on the second PDSCH, the UE 102 fails 711B to decode the second TB (e.g., due to failing to receive the second TB or otherwise failing to decode the second TB). In response, the UE 102 generates a HARQ feedback and transmits 713B the HARQ feedback to the base station 104. The HARQ feedback includes an ACK to the first TB and a NACK to the second TB.

In response to receiving 713B the NACK, the base station 104 generates and transmits 716B a second DCI to the UE 102 (where the first DCI corresponds to the DCI the base station 104 transmits at event 704B). The second DCI schedules a retransmission of the second TB on a third PDSCH. The second DCI includes a second NDI that is non-toggled (i.e., to indicate that the second TB is a retransmission rather than new data). In addition, the second DCI includes a second HARQ identifier which, is identical to the 706B second HARQ identifier. Further, the second DCI includes an indication of a second TDRA combination, the second TDRA combination corresponding to a single TDRA value of $\{K_{0\_3}\}$. The base station 104 then transmits 719B the second TB on the third PDSCH at a slot corresponding to the indicated slot offset $K_{0\_3}$. The events 716B and 719B are collectively referred to herein as a first retransmission procedure 750B.

Based on the second DCI, the UE 102 identifies $K_{0\_3}$ (e.g., by identifying $K_{0\_3}$ in a table based on an index included in the second DCI), similar to how the UE 102 identified $K_{0\_1}$ and $K_{0\_2}$. The UE 102 monitors for the second TB in accordance with the indicated slot offset $K_{0\_3}$ and receives 719B the second TB on the third PDSCH. Based on the second HARQ identifier and the non-toggled second NDI in the second DCI, the UE 102 can determine that the second TB is a retransmission of the second TB in the second PDSCH. The UE 102 can combine any data received on the second PDSCH and the second TB in the third PDSCH for decoding. If the UE 102 successfully decodes the second TB, then the UE 102 transmits 723B an ACK to the base station 104.

Figure 7C:
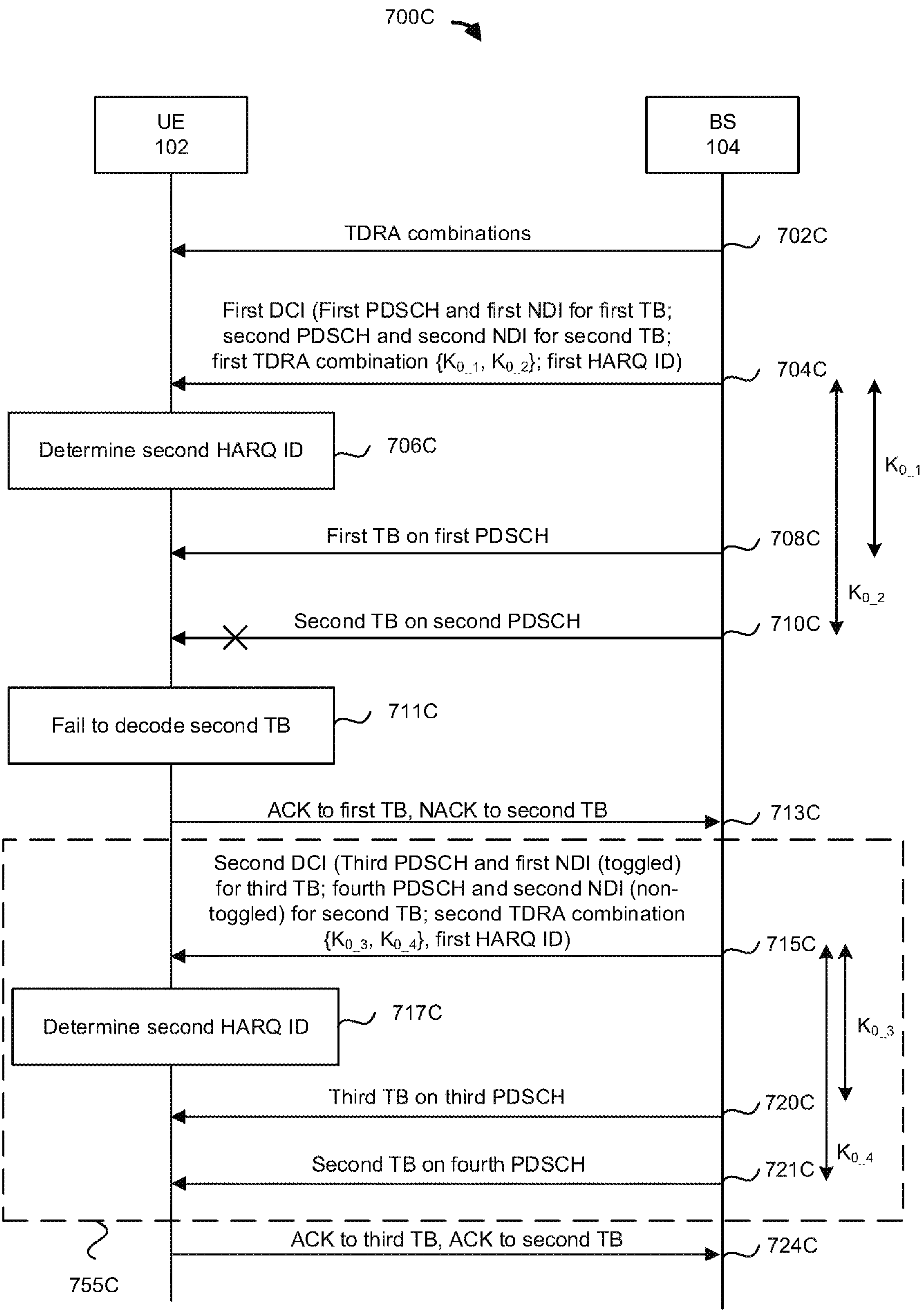
FIG. 7C is a messaging diagram of an example scenario similar to the scenario of FIG. 7A, but where the base station transmits a second control element that schedules a re-transmission of downlink data and a new downlink transmission in response to receiving a negative acknowledgement from the UE.

Referring next to FIG. 7C, the base station 104 communicates with the UE 102 in a scenario 700C, which is generally similar to the scenario 700B. Similar to the scenario 700B, the base station 104 generates a second DCI in response to receiving 713C a NACK from the UE 102. In contrast to the second DCI of FIG. 7B, the second DCI of FIG. 7C indicates two PDSCHs: a third PDSCH for transmitting a third TB corresponding to new data, and a fourth PDSCH for re-transmitting the second TB. The base station 104A may choose to schedule a transmission of new data using the second DCI if the base station 104A has new data for the UE 102 (e.g., new data stored in a buffer for the UE 102). Accordingly, the second DCI includes configuration parameters for the third PDSCH for transmitting the third TB, configuration parameters for the fourth PDSCH for transmitting the second TB. The second DCI also includes a first NDI for the third TB that is toggled to indicate that the third TB is new data and a second NDI for the second TB that is non-toggled to indicate that the second TB is a re-transmission. Further, the second DCI includes a second TDRA combination including TDRA values $\{K_{0\_3}, K_{0\_4}\}$, where $K_{0\_3}$ and $K_{0\_4}$ correspond to slot offsets for the third PDSCH and the fourth PDSCH, respectively. Still further, the second DCI includes a new first HARQ identifier for the third PDSCH.

The base station 104 transmits 715C the second DCI to the UE 102. The UE 102 can determine a second HARQ identifier based on the first HARQ identifier included in the second DCI. The UE 102 also determines the timing to monitor for the third and fourth PDSCHs by identifying the slot offsets $K_{0\_3}$ and $K_{0\_4}$. The UE 102 monitors for the third TB and second TB in accordance with the indicated slot offsets $K_{0\_3}$ and $K_{0\_4}$, receives 720C the third TB on the third PDSCH, and receives 721C the second TB on the fourth PDSCH. The events 715C, 717C, 720C, and 721C are collectively referred to herein as a second retransmission procedure 755C. While FIG. 7C illustrates the third TB being sent prior to the second TB, the base station 104 can transmit the second TB prior to the third TB in some implementations. In such implementations, the base station 104 configures the DCI accordingly. For example, the third PDSCH would correspond to the second TB and the corresponding first NDI would be non-toggled to indicate a retransmission. The fourth PDSCH would correspond to the third TB and the corresponding second NDI would be toggled to indicate that the third TB is new data.

Based on the second HARQ identifier and the non-toggled second NDI in the second DCI, the UE 102 can determine that the second TB is a retransmission of the second TB in the second PDSCH. The UE 102 can combine any data received on the second PDSCH and the second TB in the fourth PDSCH for decoding. If the UE 102 successfully decodes both the third TB and the second TB, then the UE 102 generates a HARQ feedback and transmits 724C the HARQ feedback to the base station 104. The HARQ feedback includes an ACK to the third TB and an ACK to the second TB.

Figure 7D:
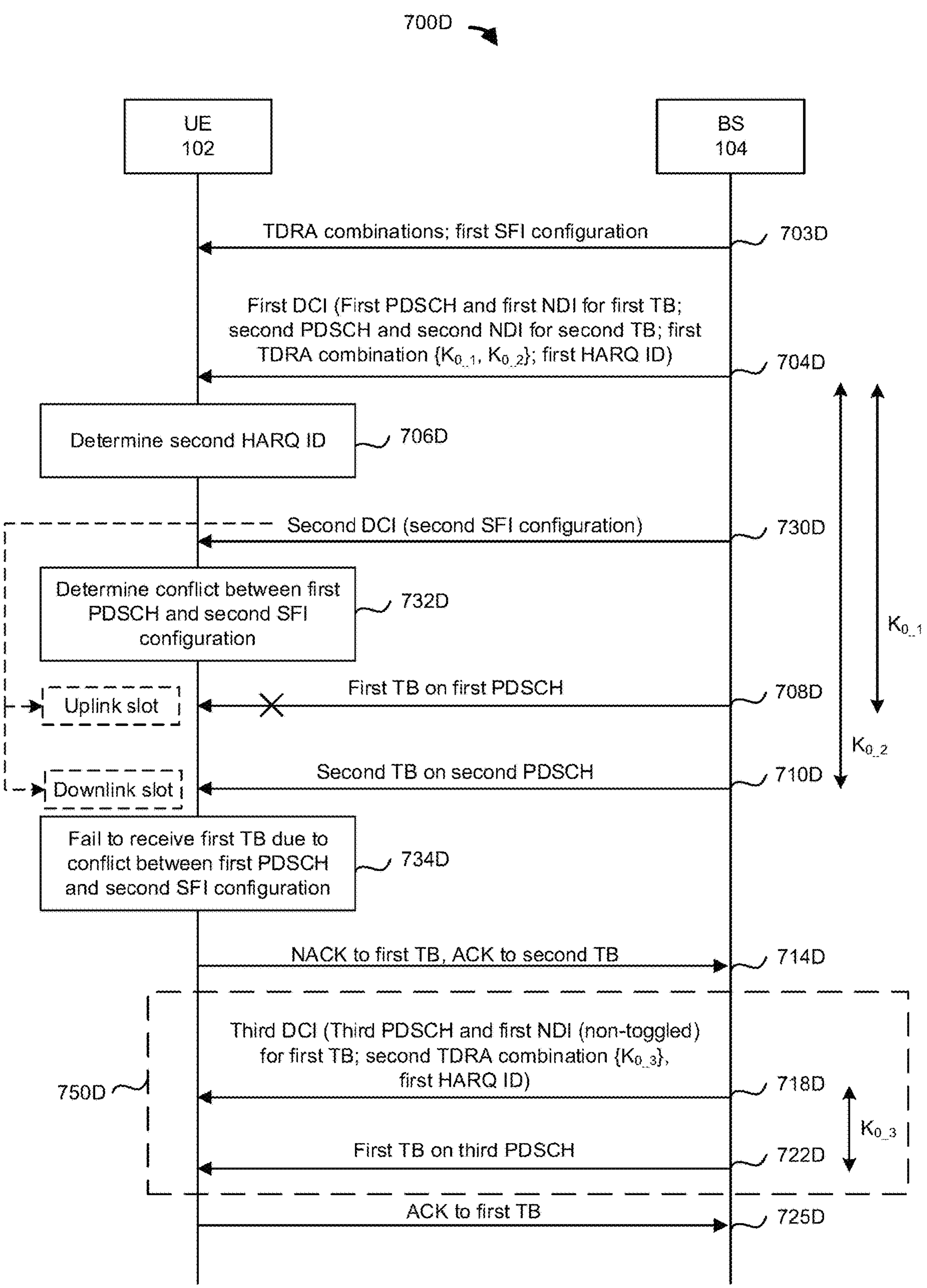
FIG. 7D is a messaging diagram of an example scenario similar to the scenario of FIG. 7A, but where the UE fails to receive downlink data due to a conflict between a slot format configuration and a scheduled downlink data channel time domain resource assignment.

FIG. 7D illustrates another scenario 700D similar to the scenario 700A, but where the UE 102 fails to receive downlink data due to a conflict between a time slot configuration and a downlink data resource assignment. The base station 104 transmits 703D the TDRA combinations and a first SFI configuration to the UE 102. The base station 104 may transmit the TDRA combinations and the first SFI configuration in an RRC message. Depending on the implementation and/or scenario, the base station 104 can transmit the TDRA combinations and the first SFI configurations in the same message or in separate messages. As mentioned with reference to FIG. 7A, the base station 104 might not transmit the TDRA combinations to the UE 102, because the UE 102 may already store the TDRA combinations. The base station 104A may transmit the first SFI configuration within DCI.

Events 704D and 706D may be similar to the events 704A-C and 706A-C. However, at some time after transmitting 704D the first DCI and before the UE 102 receives the first TB and/or the second TB, the base station 104 transmits 730D a second SFI configuration to the UE 102. The base station 104 may include the second SFI configuration within a second DCI. The second SFI configuration indicates different transmission directions for the slots than the first SFI configuration. The UE 102 can determine whether the scheduled first and second PDSCHs conform to the transmission directions indicated by the second SFI configuration. Generally speaking, if a scheduled PDSCH does not conform to an SFI configuration, the UE 102 is configured to skip receiving the scheduled PDSCH. In some scenarios, as discussed below with reference to FIG. 8, the UE 102 can identify a slot to receive the PDSCH that does conform to the SFI configuration.

In the example scenario 700D, the UE 102 determines 732D that the first PDSCH conflicts with the second SFI configuration. The UE 102 can detect a conflict by determining that at least one symbol (where a symbol is a time subunit of a slot) of the scheduled first PDSCH overlaps with an uplink symbol indicated by the second SFI configuration. For example, the UE 102 can detect a conflict by determining that the first PDSCH is scheduled for a slot that the second SFI configuration indicates is reserved for uplink transmissions. As a result, even if the base station 104 attempts 708D to transmit the first TB on the first PDSCH in accordance with the first slot offset $K_{0\_1}$, the UE 102 will fail 734D to receive the first TB due to the conflict between the first PDSCH and the second SFI configuration. Indeed, in response to determining 732D that the collision exists, the UE 102 can stop monitoring the slot corresponding to the slot $K_{0\_1}$ for the first PDSCH and skip receiving the first PDSCH. The UE 102 can still receive 710D the second TB on the second PDSCH provided the second PDSCH is scheduled for a slot that the second SFI configuration indicates is a flexible slot or a downlink slot.

In the scenario 700D, the UE 102 generates a HARQ feedback and transmits 714D the HARQ feedback to the base station 104. The HARQ feedback includes a NACK to the first TB and an ACK to the second TB. In other scenarios, the UE 102 may determine that the base station 104 is aware of the first PDSCH and the second SFI configuration and therefore is also aware of the conflict between the first PDSCH and the second SFI configuration. In response, the UE 102 may not generate a NACK to the first TB and instead may generate a HARQ feedback including only an ACK to the second TB.

In response to detecting that the first PDSCH and the second SFI configuration (e.g., by receiving 714D the NACK and/or determining, independently from the UE 102, that the first PDSCH and the second SFI configuration conflict), the base station 104 retransmits the first TB to the UE 102. Depending on the scenario, the base station 104 can retransmit the first TB using a retransmission procedure similar to either first retransmission procedure 750B or the second retransmission procedure 755C.

In the scenario 700D, the base station 104 retransmits the first TB via retransmission procedure 750D, which is similar to the first retransmission procedure 750B. In particular, the base station 104 generates and transmits 718D a third DCI to the UE 102. The third DCI schedules a retransmission of the first TB on a third PDSCH. The first NDI is non-toggled to indicate that the first TB is a retransmission, and the third DCI includes a first HARQ identifier. The third DCI also includes an indication of a second TDRA combination corresponding to a TDRA value of $\{K_{0\_3}\}$. The base station 104 then transmits 722D the second TB on the third PDSCH at a slot corresponding to the indicated slot offset $K_{0\_3}$. If the UE 102 successfully receives 722D the first TB, then the UE 102 transmits 725D an ACK to the base station 104.

In other scenarios, if the base station 104 has new data to transmit to the UE 102, the base station 104 can retransmit the first TB and transmit new data via a retransmission procedure similar to the second retransmission procedure 755C. The base station 104 can transmit a second DCI similar to the DCI the base station 104 transmits at event 715C to schedule a transmission of a new third TB on a third PDSCH and the retransmission of the first TB on a fourth PDSCH, for example.

FIGS. 8A-8D are generally similar to FIGS. 7A-7D, respectively. However, the base station 104 indicates TDRA values for the slot offsets for multiple PDSCHs in a different way from FIGS. 7A-7B. In a scenario where the base station 104 schedules two PDSCHs, instead of transmitting an indication of a particular TDRA combination of TDRA values for the first and second PDSCHs, the base station 104 transmits an indication of a single TDRA value for the first PDSCH. As will be described below with reference to FIG. 8A, the UE 102, based on the single TDRA value and other information that the UE 102 receives, determines the additional TDRA value for the second PDSCH. For example, instead of transmitting within DCI an index to a table of TDRA combinations, the base station 104 can transmit within the DCI an index to a list of TDRA values. An example TDRA list is illustrated in Table 2 below, which has the same first TDRA values as the Table 1.

TABLE 2

| Example TDRA List | |
|---|---|
| Index | TDRA Value 1 |
| 1 | 0 |
| 2 | 2 |
| 3 | $K_{0\_1}$ |

Figure 8A:
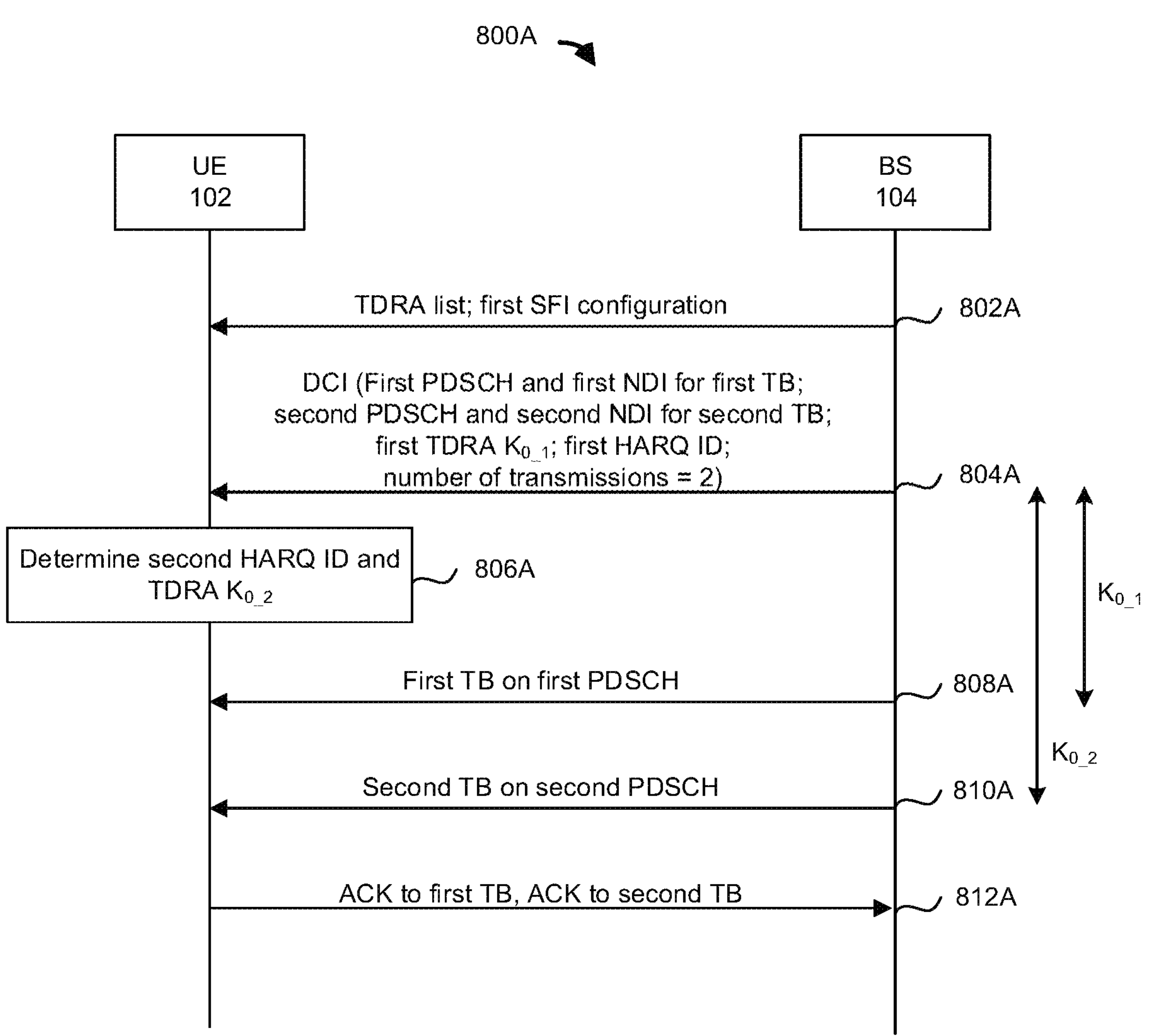
FIG. 8A is a messaging diagram of an example scenario in which a base station transmits to a UE a control element that schedules two downlink data channel time domain resource assignments and includes an index to a list including slot offsets for the first downlink data channel time domain resource assignment.

Referring to FIG. 8A, in a scenario 800A, the base station 104 transmits 802A a TDRA list and a first SFI configuration to the UE 102, and the UE stores the TDRA list and the first SFI configuration. In some implementations, the UE 102 may not receive the TDRA list from the base station 104, but may be pre-configured to store a TDRA list, or may receive the TDRA list from another base station, such as the base station 106. The base station 104 may transmit the TDRA list and the first SFI configuration in an RRC message. Depending on the implementation and/or scenario, the base station 104 can transmit the TDRA list and the first SFI configurations in the same message or in separate messages. The base station 104A may transmit the first SFI configuration within DCI.

The base station 104 then generates DCI to schedule two PDSCHs for the UE 102 and transmits 804A the DCI to the UE 102. The DCI is similar to the DCI the base station 104 transmits 704A in scenario 7A, except that the DCI includes a field indicating a first TDRA value $K_{0\_1}$ for the first PDSCH rather than a first TDRA combination for the two PDSCHs. The field may include the TDRA value, or may include an index to the TDRA list stored at the UE 102. For example, the index may correspond to the value $K_{0\_1}$ in the TDRA list. The base station 104 can select the TDRA value based on the PDCCH processing time of the UE 102, the number of PDSCH transmissions to be scheduled, and the first SFI configuration. The TDRA value $K_{0\_1}$ should correspond to a slot that is a downlink slot according to the first SFI configuration.

Similar to the DCI the base station transmits at event 704A, the DCI includes first configuration parameters such as precoding information and a modulation scheme for a first PDSCH for a first TB and second configuration parameters for a second PDSCH for a second TB. The first and second TBs are not repeated data units of the same data. For example, the first and second TBs may be associated with different MAC PDUs. The DCI also includes at least a first HARQ identifier for the first TB, a first NDI for the first TB, and a second NDI for the second TB. Further, the DCI includes a field indicating that the number of transmissions scheduled by the base station 104 is 2.

Based on the number of transmissions indicated by the DCI, the UE 102 determines that it should identify additional slot offsets in addition to the slot offset $K_{0\_1}$. The UE 102 can determine, based on the indication of the TDRA value, the slot offset $K_{0\_1}$ for the first PDSCH. For example, the DCI may include index of a list stored at the UE 102 including possible TDRA values, and the UE can identify the slot offset $K_{0\_1}$ in the list using the index. The UE 102 can determine 806A a slot offset $K_{0\_2}$ for the second PDSCH based on $K_{0\_1}$ and the first SFI configuration. More particularly, the UE 102 can locate the next available slot, after $K_{0\_1}$, for downlink reception (e.g., a downlink slot or a flexible slot), as indicated by the first SFI configuration. Further, the UE 102 also determines 806A a second HARQ ID for the second TB based on the first HARQ ID (e.g., by adding "1" to the first HARQ ID).

An example of how the UE 102 may determine additional slot offsets based on a first slot offset, an SFI configuration, and the number of transmissions can be discussed with reference to FIG. 6. If the base station 104 sends a DCI in the slot 602A to schedule three PDSCHs at slot 602D, 602G, and 602H, then the TDRA value indicated by the DCI should be 3, because the slot 602D is three slots offset from the slot 602A. The DCI should also indicate that the DCI is related to three downlink transmissions. Based on the SFI configuration, the next available slot for a downlink transmission is 602G, which is six slots away from the slot 602A. Accordingly, based on the SFI configuration and that the number of downlink transmissions is three, the UE 102 can determine that the TDRA values for the other two PDSCHs are 6 and 7, respectively.

Returning to FIG. 8A, the UE 102 can then monitor the slots indicated by the slot offsets $K_{0\_1}$ and $K_{0\_2}$ for the first TB and the second TB. Accordingly, UE 102 receives 808A the first TB on the first PDSCH, receives 810A the second TB on the second PDSCH, and transmits 812A a HARQ feedback including an ACK to the first TB and an ACK to the second TB, similar to events 708A, 710A, and 712A, respectively.

Figure 8B:
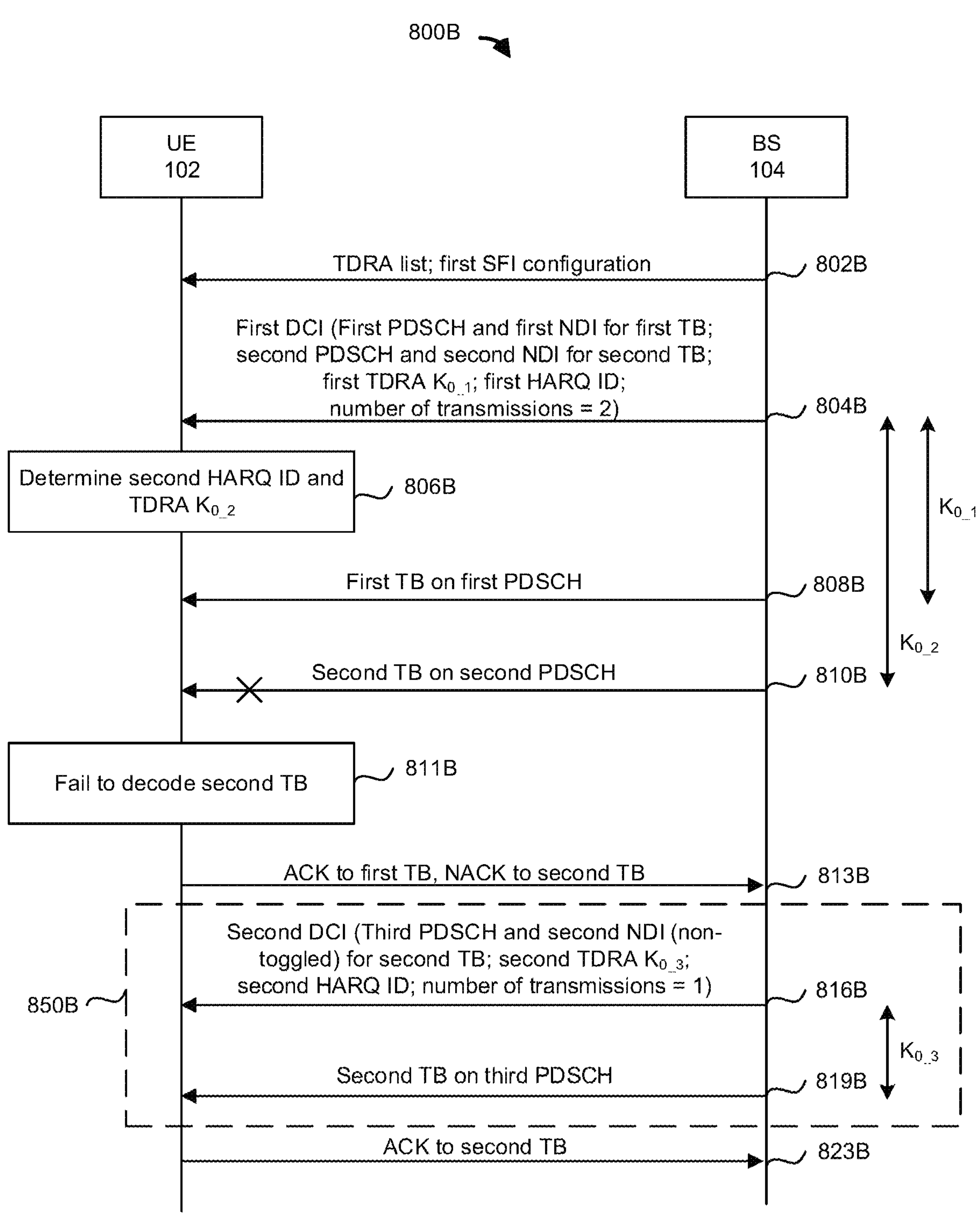
FIG. 8B is a messaging diagram of an example scenario similar to the scenario of FIG. 8A, but where the base station transmits a second control element that schedules a re-transmission of downlink data in response to receiving a negative acknowledgement from the UE.

Referring next to FIG. 8B, a scenario 800B is generally similar to the scenario 800A. However, while the base station 104 attempts to transmit 810B the second TB to the UE 102 on the second PDSCH, the UE fails 811B to decode the second TB. In response, the UE 102 generates a HARQ feedback and transmits 813B the HARQ feedback to the base station 104. The HARQ feedback includes an ACK to the first TB and a NACK to the second TB.

In response to receiving 813B the NACK, the base station performs a first retransmission procedure 850B, which is similar to the first retransmission procedure 750B. However, the second DCI the base station transmits 816B includes a second TDRA value $K_{0\_3}$ (e.g., by including an index to the TDRA value $K_{0\_3}$ in the TDRA list stored at the UE 102) and a field indicating that the number of transmissions is 1. The UE 102 identifies the slot offset $K_{0\_3}$ in the TDRA list and monitors for the second TB in accordance with the indicated slot offset $K_{0\_3}$ and receives 819B the second TB on the third PDSCH. As discussed with reference to 719B and 723B, the UE 102 decodes the second TB and transmits 823B an ACK to the base station 104.

Figure 8C:
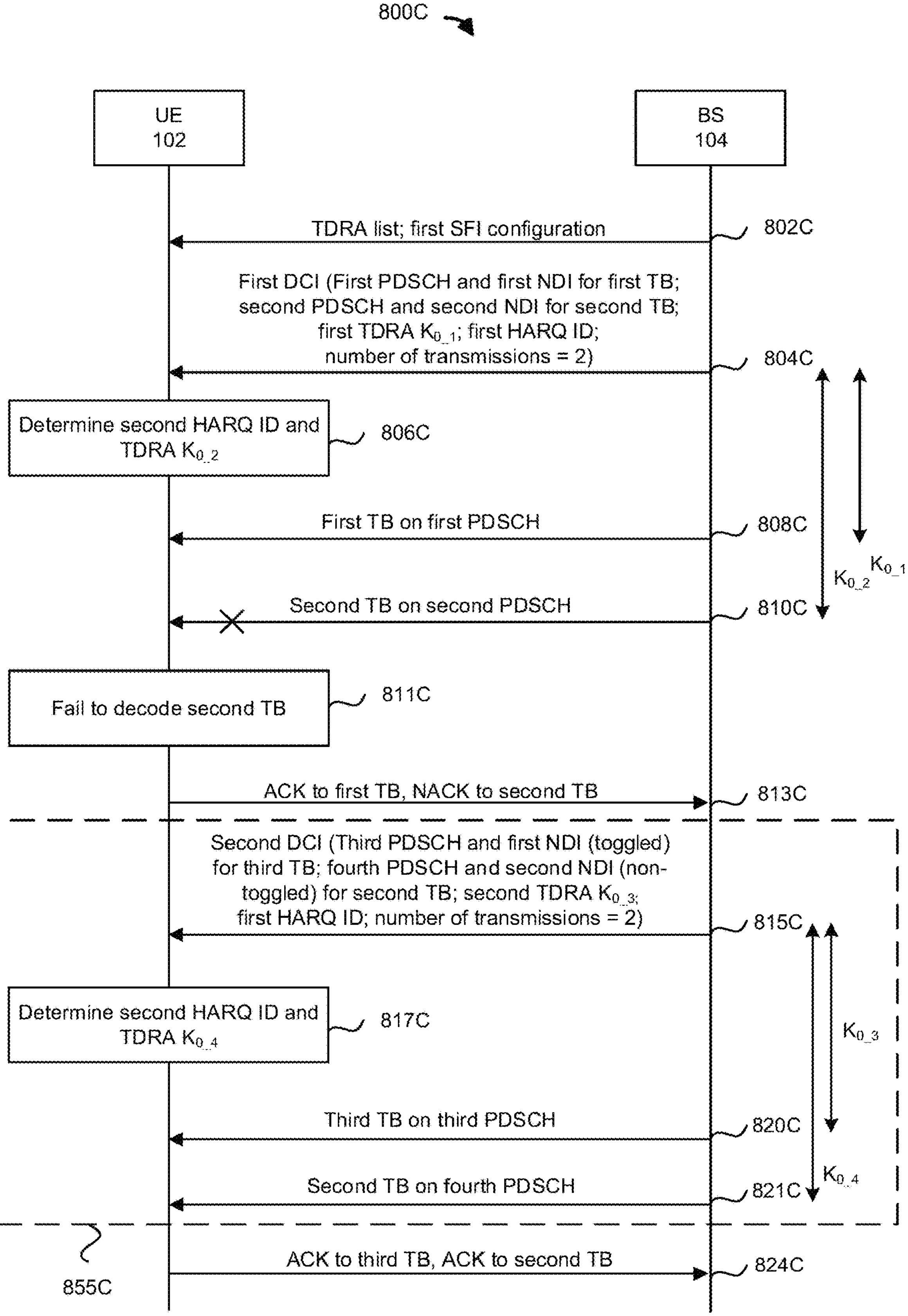
FIG. 8C is a messaging diagram of an example scenario similar to the scenario of FIG. 8A, but where the base station transmits a second control element that schedules a re-transmission of downlink data and a new downlink transmission in response to receiving a negative acknowledgement from the UE.

Referring next to FIG. 8C, a scenario 800C is generally similar to the scenario 800B. However, in response to receiving 813C a NACK, the base station 104 performs a second retransmission procedure 855C similar to the second retransmission procedure 755C. In contrast to the second DCI of FIG. 8B, the second DCI of FIG. 8C indicates two PDSCHs: a third PDSCH for transmitting a third TB corresponding to new data, and a fourth PDSCH for re-transmitting the second TB. The second DCI is thus similar to the second DCI the base station 104 transmits at event 715C. However, instead of indicating a second TDRA combination for two TDRA values as in scenario 700C, the second DCI indicates a second TDRA value $K_{0\_3}$. The second DCI may also include a field indicating that the number of scheduled downlink transmissions is 2. The UE 102 can identify $K_{0\_3}$ using the TDRA list. Using the slot offset $K_{0\_3}$ for the third PDSCH, the first SFI configuration, and the number of scheduled downlink transmissions, the UE 102 can determine 817C a TDRA value $K_{0\_4}$ corresponding to the slot offset for the fourth PDSCH. As discussed with reference to FIG. 8A, the UE 102 can determine the slot offset $K_{0\_4}$ by locating the next available slot, after $K_{0\_3}$, for downlink reception, as indicated by the first SFI configuration. The UE 102 also determines 817C a second HARQ ID for the second TB based on the first HARQ ID included in the second DCI.

The UE 102 monitors for the third TB and second TB in accordance with the slot offsets $K_{0\_3}$ and $K_{0\_4}$, receives 820C the third TB on the third PDSCH, and receives 821C the second TB on the fourth PDSCH. As discussed with respect to the second retransmission procedure 755C, in some implementations the base station 104 can transmit the second TB prior to the third TB and can configure the second DCI accordingly.

Based on the second HARQ identifier and the non-toggled second NDI in the second DCI, the UE 102 can determine that the second TB is a retransmission of the second TB in the second PDSCH. The UE 102 can combine any data received on the second PDSCH and the second TB in the fourth PDSCH for decoding. If the UE 102 successfully decodes both the third TB and the second TB, then the UE 102 generates a HARQ feedback and transmits 824C the HARQ feedback to the base station 104. The HARQ feedback includes an ACK to the third TB and an ACK to the second TB.

Figure 8D:
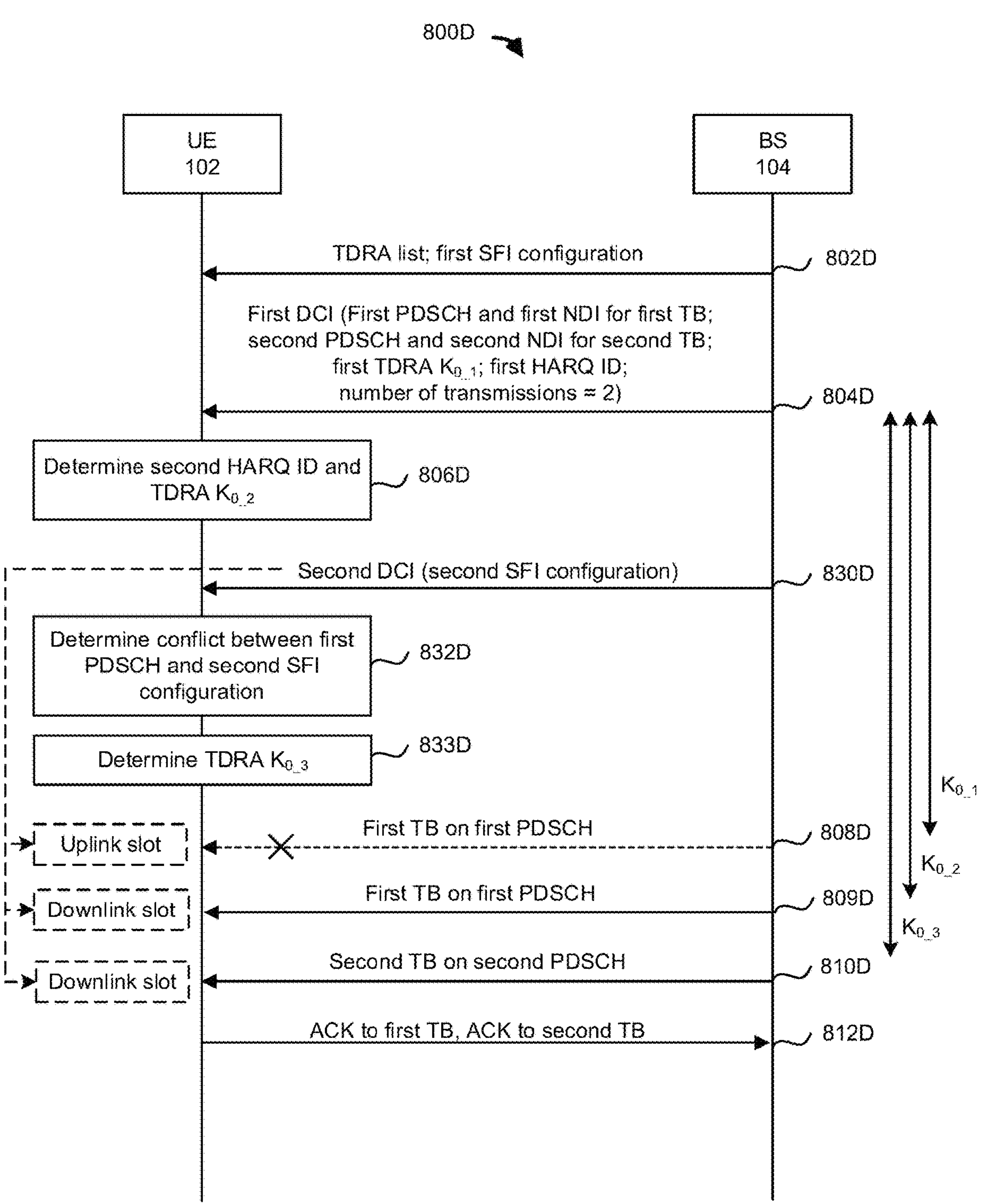
FIG. 8D is a messaging diagram of an example scenario similar to the scenario of FIG. 8A, but where the UE fails to receive downlink data due to a conflict between a time slot configuration and a scheduled downlink data channel time domain resource assignment.

FIG. 8D illustrates another scenario 800D similar to the scenario 800A, but where the UE 102 fails to receive downlink data due to a conflict between a time slot configuration and a downlink data resource assignment. Similar to the scenario 700D at event 730D, at some time after transmitting 804D the first DCI and before the UE 102 receives the first TB and/or the second TB, the base station 104 transmits 830D a second SFI configuration to the UE 102. The UE 102 can determine whether the scheduled first and second PDSCHs, based on the slot offsets $K_{0\_1}$ and $K_{0\_2}$, conform to the transmission directions indicated by the second SFI configuration.

In the example scenario 800D, the UE 102 determines 832D that the first PDSCH conflicts with the second SFI configuration. The UE 102 can detect a conflict by determining that at least one symbol of the scheduled first PDSCH overlaps with an uplink symbol indicated by the second SFI configuration. For example, the UE 102 can detect a conflict by determining that the first TB on the first PDSCH is scheduled for a slot that the second SFI configuration indicates is reserved for uplink transmissions. As a result, even if the base station 104 attempts 808D to transmit the first TB on the first PDSCH in accordance with the first slot offset $K_{0\_1}$, the UE 102 will fail to receive the first TB due to the conflict between the first PDSCH and the second SFI configuration. Indeed, in response to determining 732D that the collision exists, the UE 102 can stop monitoring the slot corresponding to the slot offset $K_{0\_1}$ for the first PDSCH and skip receiving the first PDSCH at $K_{0\_1}$.

In addition, because the first slot offset $K_{0\_1}$ is no longer available for receiving downlink data, the UE 102 determines a third slot offset in addition to $K_{0\_2}$ in order to still receive both the first and the second TBs. Based on the second SFI configuration, the UE 102 determines 833D a third TDRA value $K_{0\_3}$ corresponding to a next available downlink slot after $K_{0\_2}$. The UE 102 can determine to monitor a slot corresponding to the slot offset $K_{0\_3}$ to receive either the first TB or the second TB, as discussed below.

In particular, the base station 104 and the UE 102 may be configured to respond to a conflict between the second SFI configuration and a PDSCH using one of at least two rescheduling schemes, as discussed below.

In accordance with a first rescheduling scheme, as illustrated in FIG. 8D, the base station 104 can identify a conflict between the second SFI configuration and a first PDSCH. In response, the base station 104 can shift the first PDSCH and the second PDSCH to the next available downlink slots that conform to the second SFI configuration. The base station 104 can transmit 809D the first TB on the first PDSCH at the slot corresponding to the slot offset $K_{0\_2}$, which is the slot where the second PDSCH was previously scheduled. The base station 104 can transmit 810D the second TB on the second PDSCH at the next available downlink slot, corresponding to a slot offset of $K_{0\_3}$.

By contrast, the UE can implement a second rescheduling scheme different from the first rescheduling scheme illustrated in FIG. 8D. In accordance with a second rescheduling scheme, in response to identifying a conflict between the second SFI configuration and a first PDSCH, the base station 104 can transmit the second TB on the second PDSCH at the slot corresponding to the slot offset $K_{0\_2}$, as originally scheduled in the first DCI. The base station 104 can then transmit the first TB on the first PDSCH at the next available downlink slot, corresponding to a slot offset of $K_{0\_3}$. In such a scheme, the base station 104 may determine that HARQ feedback received based on downlink data sent at slot $K_{0\_2}$ is associated with the second TB, and that HARQ feedback received based on downlink data sent at slot $K_{0\_3}$ is associated with the first TB.

Such that the UE 102 can monitor for and process the received TBs accurately, the UE 102 should be aware of which rescheduling scheme the base station 104 is configured to implement. The UE 102 may be pre-configured with a default rescheduling scheme, and/or the base station 104 may transmit to the UE 102 an indication of the rescheduling scheme the base station 104 is implementing. In both rescheduling schemes, the UE 102 and the base station 104 can independently identify the conflict between the SFI configuration and the scheduled PDSCH and determine when the PDSCHs should be rescheduled. Accordingly, the base station 104 does not need to send an additional DCI scheduling a third PDSCH to retransmit downlink data for a conflicted PDSCH.

In any event, if the UE 102 successfully receives and decodes the first and the second TBs on the first and the second PDSCHs, respectively, then the UE 102 generates and transmits 821 a HARQ feedback to the UE 102 including both an ACK to the first TB and an ACK to the second TB.

Figure 9:
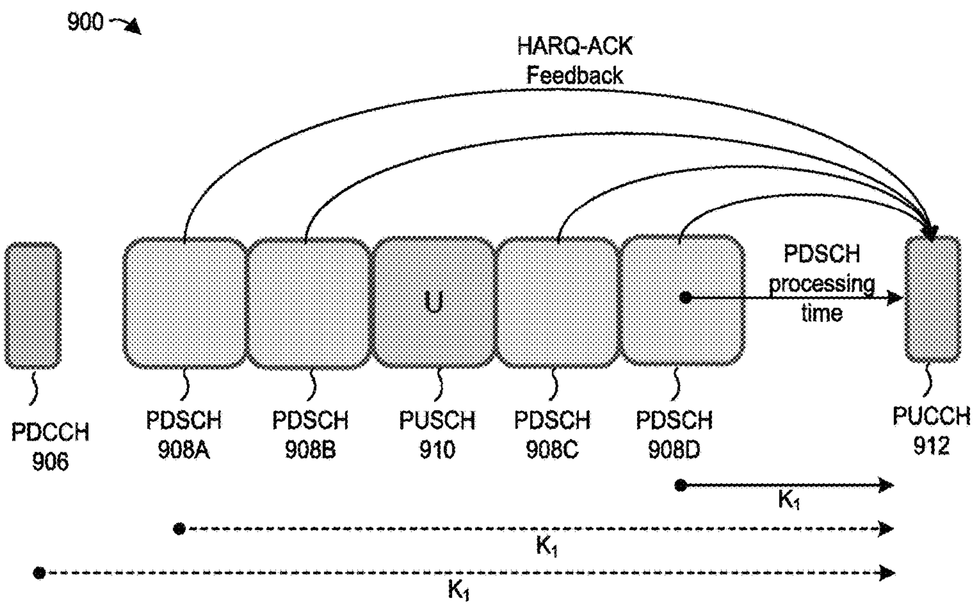
FIG. 9 is a block diagram of a slot configuration in which a base station transmits a control element that schedules four downlink data channel resource assignments and indicates an uplink control channel resource assignment for the UE to use to transmit feedback related to the four downlink data channel resource assignments.
Figure 10:
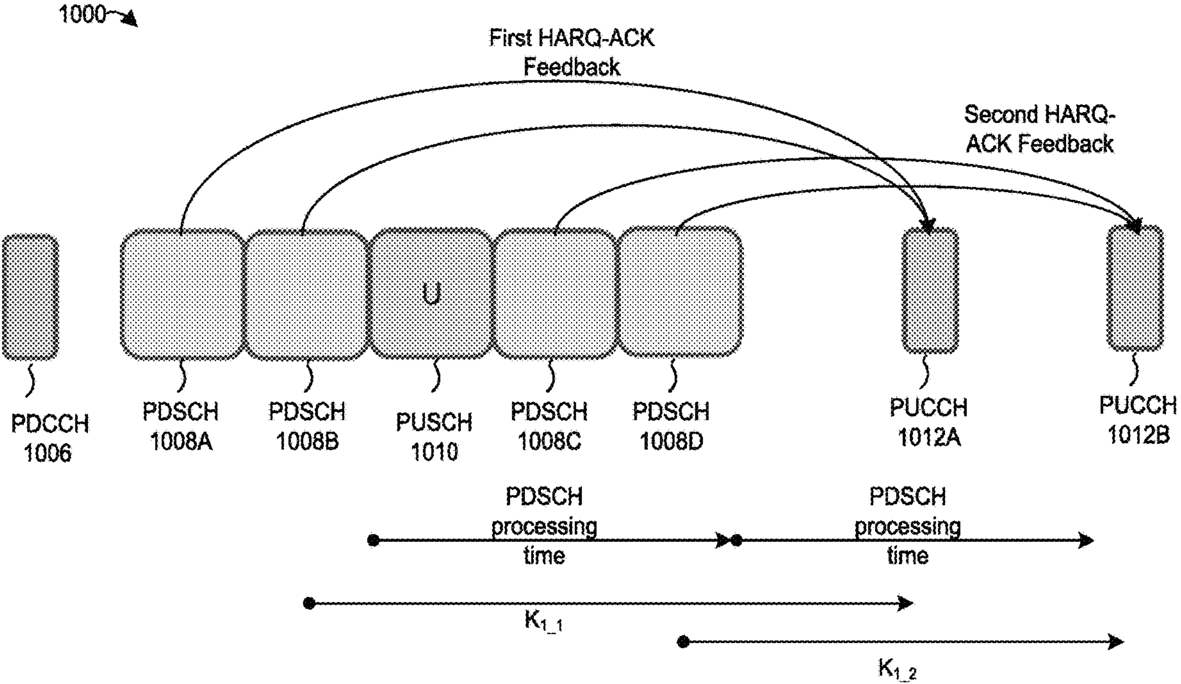
FIG. 10 is a block diagram of a slot configuration in which a base station transmits a control element that schedules four downlink data channel resource assignments and indicates two uplink control channel resource assignments for the UE to use to transmit feedback related the first two downlink data channel resource assignments and the last two downlink channel resource assignments, respectively.

FIGS. 9-10 illustrate how the base station 104 can configure the UE 102 to transmit HARQ-ACK feedback based on HARQ-ACK feedback timing resources indicated in DCI (e.g., the DCI transmitted at event 704A, the first DCI transmitted at events 704B-D, the DCI transmitted at event 804A, or the first DCI transmitted at events 804B-D). In accordance with the techniques of the disclosure, a UE 102 can generate a HARQ feedback that bundles ACKs and NACKs to multiple TBs (e.g., the UE 102 transmits 712A a HARQ feedback including an ACK to the first TB and an ACK to the second TB). Based on information included in a DCI, the UE 102 can determine when to transmit the bundled HARQ feedback.

Referring to FIG. 9, the base station 104 can indicate a HARQ-ACK feedback timing offset $K_1$ in DCI received on a PDCCH 906, where $K_1$ is a timing offset from a reference slot to a physical uplink control channel (PUCCH) slot 912 on which the UE 102 can transmit HARQ feedback. The HARQ feedback can include ACKs/NACKs, as appropriate, to the downlink data that the UE 102 attempts to receive on the four PDSCHs 908A-908B and 908C-908D (where the PDSCHs 908C-908D are separated by an uplink slot for a PUSCH 910 from the PDSCHs 908A-908B, i.e., the PDSCHS 908C-908D are scheduled on non-contiguous slots from the PDSCHs 908A-908B). As illustrated in FIG. 9, the reference slot can be the slot corresponding to the last scheduled PDSCH 908D, the slot corresponding to the first scheduled PDSCH 908A, the slot corresponding to the PDCCH 906, or a slot corresponding to the other scheduled PDSCHs 908B or 908C. The timing offset $K_1$ should be greater than or equal to the PDSCH processing time of the UE 102.

Referring to FIG. 10, the base station 104 can indicate two HARQ-ACK feedback timing offsets $K_{1\_1}$ and $K_{1\_2}$ in DCI received on a PDCCH 1006. $K_{1\_1}$ is a timing offset from a first reference slot to a first PUCCH slot 1012A and $K_{1\_2}$ is a timing offset from a second reference slot to a second PUCCH slot 1012B. A first contiguous PDSCH set (PDSCHs 1008A-1008B) may be separated from a second contiguous PDSCH set (PDSCHs 1008C-1008D) by an uplink slot for a PUSCH 1010). The base station 104 may schedule a first HARQ-ACK feedback opportunity at PUCCH slot 1012A for the UE 102 to provide HARQ feedback regarding the first contiguous PDSCH set, and a second HARQ-ACK feedback opportunity at PUCCH slot 1012B for the UE 102 to provide HARQ feedback the second contiguous PDSCH set. As one example, the first reference slot defining the timing offset $K_{1\_1}$ may be the last scheduled PDSCH (PDSCH 1008B) of the first PDSCH set, and the second reference slot defining the timing offset $K_{1\_2}$ may be the last scheduled PDSCH (PDSCH 1008D) of the second PDSCH set. As another example, the first reference slot defining the timing offset $K_{1\_1}$ may be the first scheduled PDSCH (PDSCH 1008A) of the first PDSCH set, and the second reference slot defining the timing offset $K_{1\_2}$ may be the first scheduled PDSCH (PDSCH 1008C) of the second PDSCH set. The timing offsets $K_{1\_1}$ and $K_{1\_2}$ should each be greater than or equal to the PDSCH processing time of the UE 102.

Figure 11:
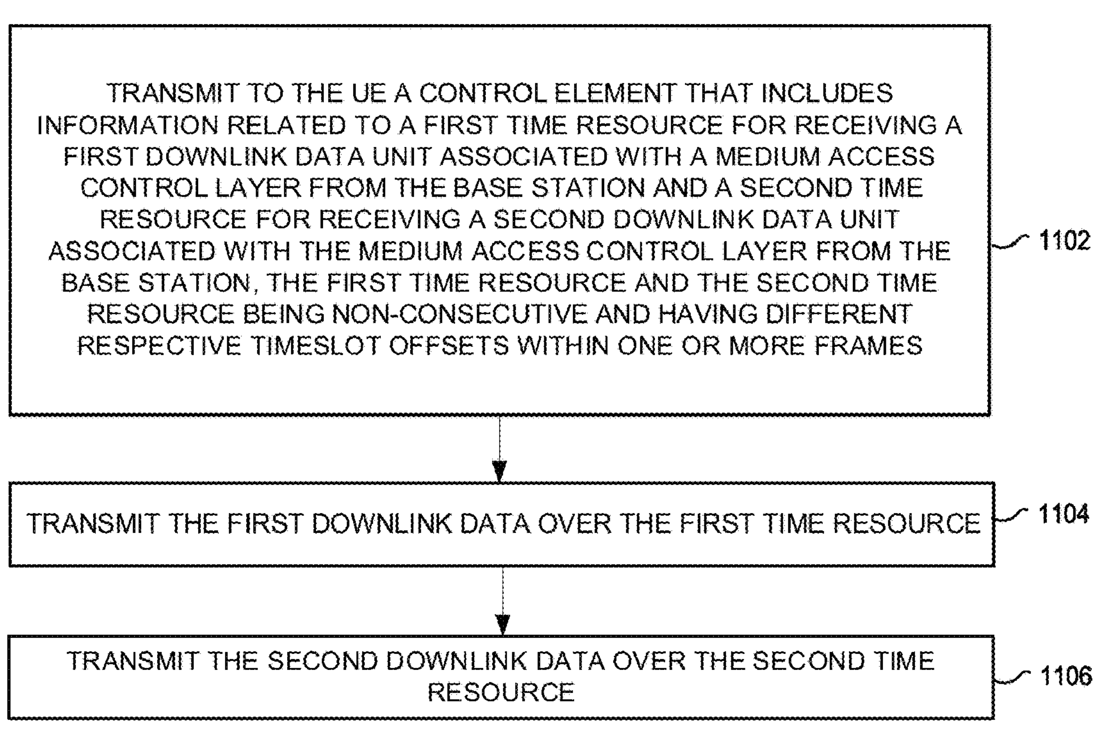
FIG. 11 is a flow diagram of an example method for scheduling downlink transmissions to a UE, which can be implemented in a base station of this disclosure.

FIG. 11 is a flow diagram of an example method 1100 for scheduling downlink transmissions to a UE (e.g., the UE 102), which can be implemented in a base station (e.g., the base station 104). At block 1102, the base station transmits, by processing hardware (e.g., the processing hardware 130) to the UE, a control element (e.g., a DCI) that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames (e.g., events 704A-D, 804A-D). A time resource can refer to a time slot on a channel such as a PDCSH.

For example, the first time resource may be for a first downlink data channel (e.g., a first PDSCH) and the second time resource may be for a second downlink data channel (e.g., a second PDSCH). Regarding the information included in the control element, the information can include configuration parameters for receiving the first downlink data unit and configuration parameters for receiving the second downlink data unit (e.g., a first modulation scheme for a first PDSCH, and a second modulation scheme for a second PDSCH). The information may also include a first HARQ identifier for the first downlink data unit. The UE can identify a second HARQ identifier for the second downlink data unit based on the first HARQ identifier. In addition, the information may include a field (e.g., an NDI) indicating whether the first downlink data unit and the second downlink data unit are new data or retransmissions. The information may include two NDIs, one for each downlink data unit, or may include one NDI with two subfields, one subfield for each downlink data unit. Further, the base station may transmit to the UE (e.g., within the control element or within a message transmitted prior to the control element, such as an RRC message) an indication of how many downlink data units the field describes. For example, the indication may be a bundling size parameter. A bundling size of two indicates to the UE to expect the field to indicate whether the downlink data unit for each of two PDSCHs is new or retransmitted.

Further, the information can include an index into a table stored at the UE that specifies a plurality of combinations of timeslot resources (e.g., Table 1 illustrating TDRA combinations). The UE may pre-store the table, or the base station may transmit the table to the UE (e.g., event 702A-C, 703D). The UE can identify a first offset for the first time resource and a second offset for the second time resource using the index. As another example, the information can include an index into a list of candidate offsets for the first time source (e.g., Table 2 illustrating a TDRA list). The UE may pre-store the list, or the base station may transmit the list to the UE (e.g., events 802A-D). The UE can identify a first offset for the first time resource using the index, and a second offset for the second time resource using the index (and/or the first offset) and a time slot configuration (e.g., an SFI configuration) indicating time slots for which downlink transmissions to the UE are allowed (e.g., events 806A-D). The UE may determine the first offset further using a number of scheduled downlink transmissions, which the information may specify. The base station may transmit the time slot configuration to the UE (e.g., events 802A-D).

At block 1104, the base station transmits, by the processing hardware to the UE, the first downlink data unit over the first time resource (e.g., event 708A-D, 808A-D, 809D). Further, at block 1106, the base station transmits, by the processing hardware to the UE, the second downlink data unit over the second time resource (e.g., event 710A-D, 810A-D). The base station may receive an ACK or a NACK from the UE for each downlink data unit. In some implementations, the base station may receive a HARQ feedback on the same PUCCH including ACKs/NACKs for both the first uplink data and the second uplink data (e.g., events 712A, 713B-C, 714D, 724C, 812A, 813B-C, 824C, 812D, FIG. 9, FIG. 10). If the base station receives a NACK for one of two downlink data units scheduled by the control element, the base station can perform a retransmission procedure. In some scenarios, the base station can transmit an additional control element indicating one time resource for retransmitting the negatively-acknowledged first or second downlink data and transmit the negatively-acknowledged first or second downlink data over the time resource (e.g., first retransmission procedure 750B, 750D, 850B). In other scenarios (e.g., if the base station has new data for the UE), the base station can transmit an additional control element indicating two time resources, one time resource for retransmitting the negatively-acknowledged first or second downlink data and one time resource for transmitting new data. The base station can then transmit the first or second downlink data and the new data over the time resources.

In some implementations, the method 1100 may further include transmitting, after transmitting the control element, a time slot configuration indicating time slots for which downlink transmissions to the UE are allowed (e.g., event 730D, 830D). The base station may detect a conflict between the time slot configuration and the first time resource and/or the second time resource. For example, the base station can receive a NACK from the UE indicating that the UE was unable to receive the first or the second downlink data unit (e.g., event 714D), and/or the base station can determine independently from the UE that the conflict exists. In response to the detection, the base station can transmit a second control element indicating information related to a time resource for receiving the first downlink data unit or the second downlink data unit (depending on which downlink data unit is associated with the conflicted time resource), where the time resource conforms to the time slot configuration (e.g., event 718D). In other implementations, in response to the detection, the base station can reconfigure at least one the first time resource or the second time resource to conform to the time slot configuration (e.g., using one of the two rescheduling schemes discussed with respect to FIG. 8D).

Figure 12:
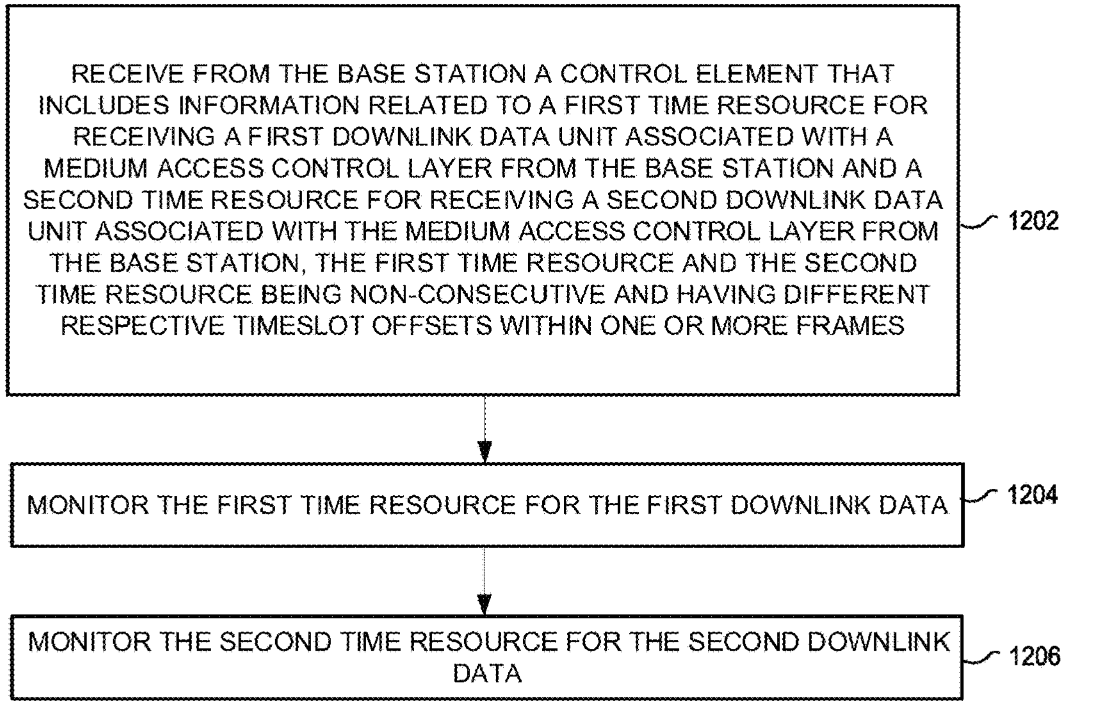
FIG. 12 is a flow diagram of an example method for managing reception of downlink transmissions from a base station, which can be implemented in a UE of this disclosure.

FIG. 12 is a flow diagram of an example method 1200 for managing reception of downlink transmissions from a base station (e.g., the base station 104), which can be implemented in a UE (e.g., the UE 102). At block 1202, the UE receives, by processing hardware (e.g., the processing hardware 150) from the base station, a control element that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames (e.g., events 704A-D, 804A-D). A time resource can refer to a time slot on a channel such as a PDCSH.

At block 1202, the UE monitors, by the processing hardware, the first time resource for the first downlink data unit (e.g., event 708A-D, 808A-D, 809D). At block 1204, the UE monitors, by the processing hardware, the second time resource for the second downlink data unit (e.g., event 710A-D, 810A-D).

The following list of examples reflects a variety of the embodiments explicitly contemplated by the present disclosure:

Example 1. A method in a base station for scheduling downlink transmissions to a user equipment (UE), the method comprising: transmitting, by processing hardware to the UE, a control element that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames; transmitting, by the processing hardware to the UE, the first downlink data unit over the first time resource; and transmitting, by the processing hardware to the UE, the second downlink data unit over the second time resource.

Example 2. The method of example 1, wherein the information includes an index into a table stored at the UE, the table specifying a plurality of combinations of timeslot resources.

Example 3. The method of example 2, further comprising: transmitting, by the processing hardware, the table to the UE.

Example 4. The method of example 2 or 3, further comprising: transmitting, by the processing hardware, a time slot configuration indicating time slots for which downlink transmissions to the UE are allowed; detecting, by the processing hardware, a conflict between the time slot configuration and the first time resource or the second time resource; and transmitting, by the processing hardware, a second control element including second information related to a time resource for receiving the conflicted first downlink data unit or the conflicted second downlink data unit from the base station, the time resource conforming to the time slot configuration.

Example 5. The method of example 1, wherein: the information includes an index into a list of candidate offsets for the first time resource, the list stored at the UE, and wherein the UE is configured to identify an offset for the second time resource using the index and a time slot configuration indicating time slots for which downlink transmissions to the UE are allowed.

Example 6. The method of example 5, wherein the information includes a number of scheduled downlink transmissions, and wherein the UE is configured to identify the offset for the second time resource further using the number of scheduled downlink transmissions.

Example 7. The method of example 5 or 6, further comprising: transmitting, by the processing hardware, the list to the UE.

Example 8. The method of any one of example 5-7, further comprising: transmitting, by the processing hardware, the time slot configuration to the UE.

Example 9. The method of any one of examples 5-8, wherein the time slot configuration is a first time slot configuration indicating first time slots for which downlink transmissions to the UE are allowed, the method further comprising: transmitting, by the processing hardware, a second time slot configuration indicating second time slots for which downlink transmissions to the UE are allowed; detecting, by the processing hardware, a conflict between the second time slot configuration and the first time resource or the second time resource; and reconfiguring, by the processing hardware, at least one of the first time resource or the second time resource to conform to the second time slot configuration.

Example 10. The method of any one of the preceding examples, wherein the first time resource is for a first downlink data channel and the second time resource is for a second downlink data channel.

Example 11. The method of any one of the preceding examples, wherein the information includes a first modulation scheme for receiving the first downlink data unit and a second modulation scheme for receiving the second downlink data unit.

Example 12. The method of any one of the preceding examples, wherein the information includes a hybrid automatic repeat request (HARQ) identifier for the first downlink data unit.

Example 13. The method of any one of the preceding examples, further comprising: receiving, by the processing hardware, a first acknowledgement for the first downlink data unit and a second acknowledgement for the second downlink data unit from the UE on an uplink control channel.

Example 14. The method of any one of the preceding examples, wherein the information includes a field indicating whether the first downlink data unit and the second downlink data unit are new data or retransmissions.

Example 15. The method of example 14, wherein the field includes a first subfield indicating whether the first downlink data unit is new or retransmitted and a second subfield indicating whether the second downlink data unit is new or retransmitted.

Example 16. The method of example 14 or 15, further comprising: transmitting, by the processing hardware to the UE, an indication of how many downlink data units the field describes.

Example 17. The method of any one of the preceding examples, wherein the control element is a Downlink Control Information (DCI) field.

Example 18. The method of any of the preceding examples, further comprising: receiving, by the processing hardware from the UE, a negative acknowledgement for the first downlink data unit or the second downlink data unit; transmitting, by the processing hardware to the UE, an additional control element that includes information related to a third time resource for receiving the negatively-acknowledged first downlink data unit or the negatively-acknowledged second downlink data unit; and transmitting, by the processing hardware to the UE, the negatively-acknowledged first downlink data unit or the negatively-acknowledged second downlink data unit over the third time resource.

Example 19. The method of example 18, wherein the information included in the additional control element is related to the third time resource and to a fourth time resource for receiving a third downlink data unit, wherein the method further comprises transmitting, by the processing hardware to the UE, the third downlink data over the fourth time resource.

Example 20. A base station including processing hardware and configured to implement a method of any one of the preceding examples.

Example 21. A method in a user equipment (UE) for managing reception of downlink transmissions from a base station, the method comprising: receiving, by processing hardware from the base station, a control element that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames; monitoring, by the processing hardware, the first time resource for the first downlink data unit; and monitoring, by the processing hardware, the second time resource for the second downlink data unit.

Example 22. The method of example 21, wherein the information includes an index into a table stored at the UE, the table specifying a plurality of combinations of timeslot resources.

Example 23. The method of example 22, further comprising: identifying, by the processing hardware, a first offset for the first time resource and a second offset for the second time resource in the table based on the index, wherein monitoring the first time resource and the second time resource includes monitoring the first time resource and the second time resource in accordance with the first offset and the second offset, respectively.

Example 24. The method of example 22 or 23, further comprising: receiving, by the processing hardware, the table from the base station.

Example 25. The method of any one of examples 22-24, further comprising: receiving, by the processing hardware, a time slot configuration indicating time slots for which downlink transmissions to the UE are allowed; detecting, by the processing hardware, a conflict between the time slot configuration and the first time resource or the second time resource; and in response to the detection, stopping monitoring for the respective first time resource or the second time resource.

Example 26. The method of example 25, further comprising: transmitting a negative acknowledgement for the conflicted first downlink data unit or the conflicted second downlink data unit to the base station.

Example 27. The method of example 21, wherein the information includes an index into a list of candidate offsets for the first time resource, the list stored at the UE, and wherein the method further comprises: identifying, by the processing hardware, a first offset, for the first time resource, in the list based on the index; and identifying, by the processing hardware, a second offset, for the second time resource, based on the first offset and a time slot configuration indicating time slots for which downlink transmissions to the UE are allowed, wherein monitoring the first time resource and the second time resource includes monitoring the first time resource and the second time resource in accordance with the first offset and the second offset, respectively.

Example 28. The method of example 27, wherein the information includes a number of scheduled downlink transmissions, and wherein the identifying the second offset is further based on the number of scheduled downlink transmissions.

Example 29. The method of example 27 or 28, further comprising: receiving, by the processing hardware, the list from the base station.

Example 30. The method of any one of examples 27-29, further comprising: receiving, by the processing hardware, the time slot configuration from the base station.

Example 31. The method of any one of examples 27-30, wherein the time slot configuration is a first time slot configuration indicating first time slots for which downlink transmissions to the UE are allowed, the method further comprising: receiving, by the processing hardware, a second time slot configuration indicating second time slots for which downlink transmissions to the UE are allowed; detecting, by the processing hardware, a conflict between the second time slot configuration and the first time resource or the second time resource; and determining, based on the second slot formation configuration, at least one new time resource that conforms to the second time slot configuration; and monitoring, by the processing hardware, the at least one new time resource.

Example 32. The method of any one of examples 21-31, wherein the first time resource is for a first downlink data channel and the second time resource is for a second downlink data channel.

Example 33. The method of any one of examples 21-32, wherein the information includes a first modulation scheme for receiving the first downlink data unit and a second modulation scheme for receiving the second downlink data unit.

Example 34. The method of any one of examples 21-33, wherein the information includes a hybrid automatic repeat request (HARQ) identifier for the first downlink data unit; and wherein the method further comprises determining, by the processing hardware, a second HARQ identifier for the second downlink data unit based on the first HARQ identifier.

Example 35. The method of any one of examples 21-34, further comprising: transmitting, by the processing hardware, a first acknowledgement for the first downlink data unit and a second acknowledgement for the second downlink data unit to the base station on an uplink control channel.

Example 36. The method of any one of examples 21-35, wherein the information includes a field indicating whether the first downlink data unit and the second downlink data unit are new data or retransmissions.

Example 37. The method of example 36, wherein the field includes a first subfield indicating whether the first downlink data unit is new or retransmitted and a second subfield indicating whether the second downlink data unit is new or retransmitted.

Example 38. The method of example 36 or 37, further comprising: receiving, by the processing hardware from the base station, an indication of how many downlink data units the field describes.

Example 39. The method of any one of examples 21-38, further comprising: receiving, by the processing hardware, the first downlink data unit; and receiving, by the processing hardware, the second downlink data unit.

Example 40. The method of any one of examples 21-39, wherein the control element is a Downlink Control Information (DCI) field.

Example 41. The method of any one of the examples 21-40, further comprising: transmitting, by the processing hardware to the base station, a negative acknowledgement for the first downlink data unit or the second downlink data unit; receiving, by the processing hardware from the base station, an additional control element that includes information related to a third time resource for receiving the negatively-acknowledged first downlink data unit or the negatively-acknowledged second downlink data unit; and monitoring, by the processing hardware, the third time resource for the negatively-acknowledged first downlink data unit or the negatively-acknowledged second downlink data unit.

Example 42. The method of example 41, wherein the information included in the additional control element is related to the third time resource and to a fourth time resource for receiving a third downlink data unit, wherein the method further comprises monitoring, by the processing hardware, the fourth time resource for the third downlink data unit.

Example 43. A user equipment (UE) including processing hardware and configured to implement a method of any one of examples 21-42.

The following additional considerations apply to the foregoing discussion.

In accordance with the techniques of this disclosure, a base station may schedule a UE to monitor multiple PDSCHs over non-contiguous slots and multiple frames based on a UE capability. The PDSCH transmissions and retransmissions can be scheduled by the same or different cell(s) of a base station. For example, PDCCH, PDSCH, and PUSCH transmissions can be sent by and/or to the same or different cell(s) of a base station. A cell of a base station can acquire the UE capability using the following example procedures. If a cell of the base station is a master node (MN), the cell can send an RRC message (e.g., a UECapabilityEnquiry) to a UE. The UE can include the UE capability in an RRC message (e.g., a UECapabilityInformation), and send the RRC message to the cell. If the UE moves from a first cell to a second cell of the base station and both the first and the second cells are MNs, the first cell can send the UE capability to the second cell according to a handover procedure. If a cell of the base station is a secondary node (SN), the UE capability can be passed from an MN to the SN.

A user device in which the techniques of this disclosure can be implemented (e.g., the UE 102) can be any suitable device capable of wireless communications such as a smartphone, a tablet computer, a laptop computer, a mobile gaming console, a point-of-sale (POS) terminal, a health monitoring device, a drone, a camera, a media-streaming dongle or another personal media device, a wearable device such as a smartwatch, a wireless hotspot, a femtocell, or a broadband router. Further, the user device in some cases may be embedded in an electronic system such as the head unit of a vehicle or an advanced driver assistance system (ADAS). Still further, the user device can operate as an internet-of-things (IoT) device or a mobile-internet device (MID). Depending on the type, the user device can include one or more general-purpose processors, a computer-readable memory, a user interface, one or more network interfaces, one or more sensors, etc.

Certain embodiments are described in this disclosure as including logic or a number of components or modules. Modules may can be software modules (e.g., code, or machine-readable instructions stored on non-transitory machine-readable medium) or hardware modules. A hardware module is a tangible unit capable of performing certain operations and may be configured or arranged in a certain manner. A hardware module can include dedicated circuitry or logic that is permanently configured (e.g., as a special-purpose processor, such as a field programmable gate array (FPGA) or an application-specific integrated circuit (ASIC), a digital signal processor (DSP)) to perform certain operations. A hardware module may also include programmable logic or circuitry (e.g., as encompassed within a general-purpose processor or other programmable processor) that is temporarily configured by software to perform certain operations. The decision to implement a hardware module in dedicated and permanently configured circuitry, or in temporarily configured circuitry (e.g., configured by software) may be driven by cost and time considerations.

When implemented in software, the techniques can be provided as part of the operating system, a library used by multiple applications, a particular software application, etc. The software can be executed by one or more general-purpose processors or one or more special-purpose processors.

Upon reading this disclosure, those of skill in the art will appreciate still additional and alternative structural and functional designs for the scheduling techniques disclosed herein. Thus, while particular embodiments and applications have been illustrated and described, it is to be understood that the disclosed embodiments are not limited to the precise construction and components disclosed herein. Various modifications, changes and variations, which will be apparent to those of ordinary skill in the art, may be made in the arrangement, operation and details of the method and apparatus disclosed herein without departing from the spirit and scope defined in the appended claims.

What is claimed is:

1. A method implemented in a base station for scheduling downlink transmissions to a user equipment (UE), the method comprising:

transmitting, to the UE, a control element that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames, the information including an index into a table stored at the UE, the table specifying a plurality of combinations of timeslot resources, each combination of timeslot resources including at least a first candidate timeslot offset for the first time resource and a second candidate timeslot offset for the second time resource, the information further including a field with a first subfield indicating whether the first downlink data unit is new or retransmitted and a second subfield indicating whether the second downlink data unit is new or retransmitted;

transmitting, to the UE, the first downlink data unit over the first time resource; and transmitting, to the UE, the second downlink data unit over the second time resource.

2. The method of claim 1, further comprising:

transmitting a time slot configuration indicating time slots for which downlink transmissions to the UE are allowed;

detecting a conflict between the time slot configuration and the first time resource or the second time resource; and transmitting a second control element including second information related to a time resource for receiving, from the base station, the first downlink data unit when the conflict is with the first time resource or the second downlink data unit when the conflict is with the second time resource, the time resource conforming to the time slot configuration.

3. The method of claim 1, wherein the UE is configured to identify an offset for the second time resource using the index and a time slot configuration indicating time slots for which downlink transmissions to the UE are allowed.

4. The method of claim 3, wherein the information includes a number of scheduled downlink transmissions, and wherein the UE is configured to identify the offset for the second time resource further using the number of scheduled downlink transmissions.

5. The method of claim 3, wherein the time slot configuration is a first time slot configuration indicating first time slots for which downlink transmissions to the UE are allowed, the method further comprising:

transmitting a second time slot configuration indicating second time slots for which downlink transmissions to the UE are allowed;

detecting a conflict between the second time slot configuration and the first time resource or the second time resource; and reconfiguring at least one of the first time resource or the second time resource to conform to the second time slot configuration.

6. The method of claim 1, wherein the control element is a Downlink Control Information (DCI) field.

7. A base station configured to implement scheduling downlink transmissions to a user equipment (UE), the base station including:

a transceiver; and processing hardware configured to:

transmit, to the UE, a control element that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames, the information including an index into a table stored at the UE, the table specifying a plurality of combinations of timeslot resources, each combination of timeslot resources including at least a first candidate timeslot offset for the first time resource and a second candidate timeslot offset for the second time resource, the information further including a field with a first subfield indicating whether the first downlink data unit is new or retransmitted and a second subfield indicating whether the second downlink data unit is new or retransmitted;

transmit, to the UE, the first downlink data unit over the first time resource; and transmit, to the UE, the second downlink data unit over the second time resource.

8. The base station of claim 7, wherein the table specifies a plurality of combinations of timeslot resources, each combination of timeslot resources including at least a first candidate timeslot offset for the first time resource and a second candidate timeslot offset for the second time resource.

9. The base station of claim 7, wherein the processing hardware is further configured to:

transmit a time slot configuration indicating time slots for which downlink transmissions to the UE are allowed;

detect conflict between the time slot configuration and the first time resource or the second time resource; and transmit second control element including second information related to a time resource for receiving, from the base station, the first downlink data unit when the conflict is with the first time resource or the second downlink data unit when the conflict is with the second time resource, the time resource conforming to the time slot configuration.

10. The base station of claim 7, wherein:

the information includes a number of scheduled downlink transmissions;

and the UE is configured to identify an offset for the second time resource using (i) the index, (ii) a time slot configuration indicating time slots for which downlink transmissions to the UE are allowed, and (iii) the number of scheduled downlink transmissions.

11. The base station of claim 10, wherein the time slot configuration is a first time slot configuration indicating first time slots for which downlink transmissions to the UE are allowed, the processing hardware further configured to:

transmit a second time slot configuration indicating second time slots for which downlink transmissions to the UE are allowed;

detect a conflict between the second time slot configuration and the first time resource or the second time resource; and reconfigure least one of the first time resource or the second time resource to conform to the second time slot configuration.

12. The base station of claim 7, wherein the control element is a Downlink Control Information (DCI) field.

13. A method implemented in a user equipment (UE) for managing reception of downlink transmissions from a base station, the method comprising:

receiving, from the base station, a control element that includes information related to a first time resource for receiving a first downlink data unit associated with a media access control layer from the base station and a second time resource for receiving a second downlink data unit associated with the media access control layer from the base station, the first time resource and the second time resource being non-consecutive and having different respective timeslot offsets within one or more frames, the information including an index into a table stored at the UE, the table specifying a combinations of timeslot resources, each combination of timeslot resources including at least a first candidate timeslot offset for the first time resource and a second candidate timeslot offset for the second time resource, the information further including a field with a first subfield indicating whether the first downlink data unit is new or retransmitted and a second subfield indicating whether the second downlink data unit is new or retransmitted;

monitoring the first time resource for the first downlink data unit; and monitoring the second time resource for the second downlink data unit.

14. The method of claim 13, further comprising:

identifying a first offset for the first time resource and a second offset for the second time resource in the table based on the index, wherein monitoring the first time resource and the second time resource includes monitoring the first time resource and the second time resource in accordance with the first offset and the second offset, respectively.

15. The method of claim 13, wherein the method further comprises:

identifying a first offset, for the first time resource, in the table based on the index; and identifying a second offset, for the second time resource, based on the first offset and a time slot configuration indicating time slots for which downlink transmissions to the UE are allowed, wherein monitoring the first time resource and the second time resource includes monitoring the first time resource and the second time resource in accordance with the first offset and the second offset, respectively.

* * * * *